(12) United States Patent
Oh

(10) Patent No.: US 12,126,905 B2
(45) Date of Patent: Oct. 22, 2024

(54) SENSOR DRIVING APPARATUS

(71) Applicant: LG INNOTEK CO., LTD., Seoul (KR)

(72) Inventor: Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 279 days.

(21) Appl. No.: 17/753,356

(22) PCT Filed: Aug. 26, 2020

(86) PCT No.: PCT/KR2020/011380
§ 371 (c)(1),
(2) Date: Feb. 28, 2022

(87) PCT Pub. No.: WO2021/040397
PCT Pub. Date: Mar. 4, 2021

(65) Prior Publication Data
US 2022/0337753 A1  Oct. 20, 2022

(30) Foreign Application Priority Data
Aug. 30, 2019  (KR) .................. 10-2019-0107739

(51) Int. Cl.
*G03B 17/02* (2021.01)
*H04N 23/51* (2023.01)
(Continued)

(52) U.S. Cl.
CPC .......... *H04N 23/687* (2023.01); *H04N 23/51* (2023.01); *H04N 23/54* (2023.01)

(58) Field of Classification Search
USPC ......... 396/55, 133; 348/208.1–208.8, 208.11
See application file for complete search history.

(56) References Cited

U.S. PATENT DOCUMENTS 9,531,953 B2    12/2016  Kwon et al.
10,020,248 B2 *  7/2018  Yoo .................. H01L 23/315
(Continued)

FOREIGN PATENT DOCUMENTS

KR    10-2015-0042681 A    4/2015
KR       10-1730268 B1     4/2017
(Continued)

OTHER PUBLICATIONS

International Search Report dated Nov. 13, 2020 in International Application No. PCT/KR2020/011380.

*Primary Examiner* — Clayton E. LaBalle
*Assistant Examiner* — Warren K Fenwick
(74) *Attorney, Agent, or Firm* — Saliwanchik, Lloyd & Eisenschenk

(57) ABSTRACT

A sensor driving apparatus according to an embodiment includes a fixed portion including a magnet holder, a magnet portion coupled to the magnet holder, and a first substrate disposed on the magnet holder and including a first lead pattern portion; a moving portion disposed to be spaced apart from the fixed portion by a predetermined interval and including a sensor; and a wire portion including a plurality of wires disposed between the moving portion and the fixed portion, wherein the wire portion has one end connected to the first lead pattern portion and the other end connected to the moving portion to elastically support the moving portion.

19 Claims, 23 Drawing Sheets

(51) Int. Cl.
*H04N 23/54* (2023.01)
*H04N 23/68* (2023.01)

(56) References Cited

U.S. PATENT DOCUMENTS

| | | |
|---|---|---|
| 10,033,303 B2 | 7/2018 | Liu et al. |
| 2008/0273092 A1 | 11/2008 | Chiou et al. |
| 2020/0303445 A1* | 9/2020 | Kang .................. H01L 31/0203 |
| 2023/0171882 A1* | 6/2023 | Kim ........................ G03B 5/02 |
| | | 348/208.7 |
| 2024/0027874 A1* | 1/2024 | Won ........................ G03B 3/10 |

FOREIGN PATENT DOCUMENTS

| | | |
|---|---|---|
| KR | 10-2018-0081087 A | 7/2018 |
| WO | 2019004643 A1 | 1/2019 |

* cited by examiner

SENSOR DRIVING APPARATUS

CROSS-REFERENCE TO RELATED APPLICATIONS

This application is the U.S. national stage application of International Patent Application No. PCT/KR2020/011380, filed Aug. 26, 2020, which claims the benefit under 35 U.S.C. § 119 of Korean Application No. 10-2019-0107739, filed Aug. 30, 2019, the disclosures of each of which are incorporated herein by reference in their entirety.

TECHNICAL FIELD

An embodiment relates to an image sensor driving apparatus and a camera device including the same.

BACKGROUND ART

As various portable terminals are widely used and the wireless Internet service is commercialized, needs of consumers related to the portable terminals are diversified, and various kinds of additional devices are installed in the portable terminals.

A representative one of them is a camera device for photographing a subject in a photograph or a moving image. Meanwhile, recent camera devices employ a camera shake correction function for inhibiting a phenomenon in which an image shakes due to camera shake of a photographer.

However, the lens shift in a x-axis/y-axis directions used in a conventional camera shake correction module has a limitation in correcting various kinds of camera shake.

DISCLOSURE

Technical Problem

A present embodiment provides a camera device capable of correcting hand shake for x-axis direction shift, y-axis direction shift, and rotation about the z-axis.

Furthermore, the present embodiment provides a camera device in which hand shake correction through a lens and hand shake correction through an image sensor are performed together.

Furthermore, the present embodiment provides an image sensor substrate that can simplify a spring structure for providing an autofocus function and a handshake compensation function and a camera module including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A sensor driving apparatus according to an embodiment includes a fixed portion including a magnet holder, a magnet portion coupled to the magnet holder, and a first substrate disposed on the magnet holder and including a first lead pattern portion; a moving portion disposed to be spaced apart from the fixed portion by a predetermined interval and including a sensor; and a wire portion including a plurality of wires disposed between the moving portion and the fixed portion, wherein the wire portion has one end connected to the first lead pattern portion and the other end connected to the moving portion to elastically support the moving portion.

The moving portion includes a second lead pattern portion, and the other end of the wire portion is connected to the second lead pattern portion.

In addition, the second lead pattern portion includes: a body part; a coupling part coupled to the other end of the wire portion; and a connection part connecting the body part and the coupling part.

In addition, the first lead pattern portion includes a plurality of first lead patterns, wherein the second lead pattern portion includes a plurality of second lead patterns, wherein the wire portion includes a plurality of wires, and wherein a number of the plurality of wires is equal to or less than each of a number of the plurality of first lead patterns and a number of the plurality of second lead patterns.

In addition, the moving portion includes an insulating layer on which the second lead pattern portion is disposed.

In addition, the connection part of the second lead pattern portion includes a bent region In addition, the moving portion includes: a second substrate on which a coil portion facing the magnet portion is disposed, and including a first pad portion; a third substrate disposed between the second substrate and the second lead pattern portion and including a second pad portion connected to the first pad portion and a third pad portion electrically connected to the second lead pattern portion.

In addition, the sensor driving apparatus further comprises a substrate holder disposed between the second substrate and the second lead pattern portion.

In addition, the sensor driving apparatus further comprises a driving circuit disposed on the second substrate; and wherein the second substrate includes a hole through which the wire portion passes.

In addition, the sensor driving apparatus further comprises a sensor substrate on which the sensor is disposed, and wherein the third substrate includes an opening in which the sensor substrate is disposed.

In addition, the wire portion includes a plurality of wires, the magnet portion includes a plurality of magnets, and wherein the plurality of wires are positioned between the plurality of magnets.

On the other hand, a sensor driving apparatus device according to the embodiment comprises a fixed portion including a magnet holder, a magnet portion coupled to the magnet holder and a first substrate disposed on the magnet holder and including a first lead pattern portion; a moving portion disposed to be spaced apart from the fixed portion by a predetermined interval and including a sensor; and a plurality of wires disposed between the moving portion and the fixed portion, wherein the moving portion includes a second lead pattern portion and a second substrate portion disposed between the second lead pattern portion and the fixed portion and including a pad portion, wherein one end of the plurality of wires is connected to the first lead pattern portion and the other end is connected to the second lead pattern portion, and wherein the pad portion is electrically connected to the second lead pattern portion.

Effects of the Invention

According to the embodiment, in order to realize OIS and AF functions of the camera module, instead of moving the conventional lens barrel, the image sensor is moved relative to the lens barrel in the X-axis, Y-axis, and Z-axis directions. Accordingly, the camera module according to the embodiment may remove a complicated spring structure for realizing the OIS and AF functions, thereby simplifying a structure. In addition, the structure that is more stable than the existing one may be formed by moving the image sensor according to the embodiment relative to the lens barrel.

In addition, according to the embodiment, the terminal portion electrically connected to the image sensor has a spring structure and is disposed to be floated at a position not overlapped with the insulating layer in the vertical direction. Accordingly, the camera module may move the image sensor relative to the lens barrel while supporting the image sensor stably and elastically.

According to the above-described embodiment, a X-axis direction shift, a Y-axis direction shift, and a Z-axis-centered rotation corresponding to camera shake with respect to the image sensor may be performed, and accordingly, the camera shake correction with respect to the lens corresponding to the camera shake correction with respect to the image sensor may be performed together, thereby providing a more enhanced camera shake correction function.

In addition, according to the embodiment, it is possible to reduce a total height of the camera device by embedding electrical elements required for a camera circuit by utilizing an internal space of the second actuator for moving the image sensor relative to the lens barrel.

Further, according to the embodiment, a camera assembly process may be simplified by integrating and fusing components of the camera circuit and components of the second actuator.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (A, and (b) may be used.

These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

Hereinafter, an embodiment of the present disclosure will be described in detail with reference to the accompanying drawings.

Figure 1:
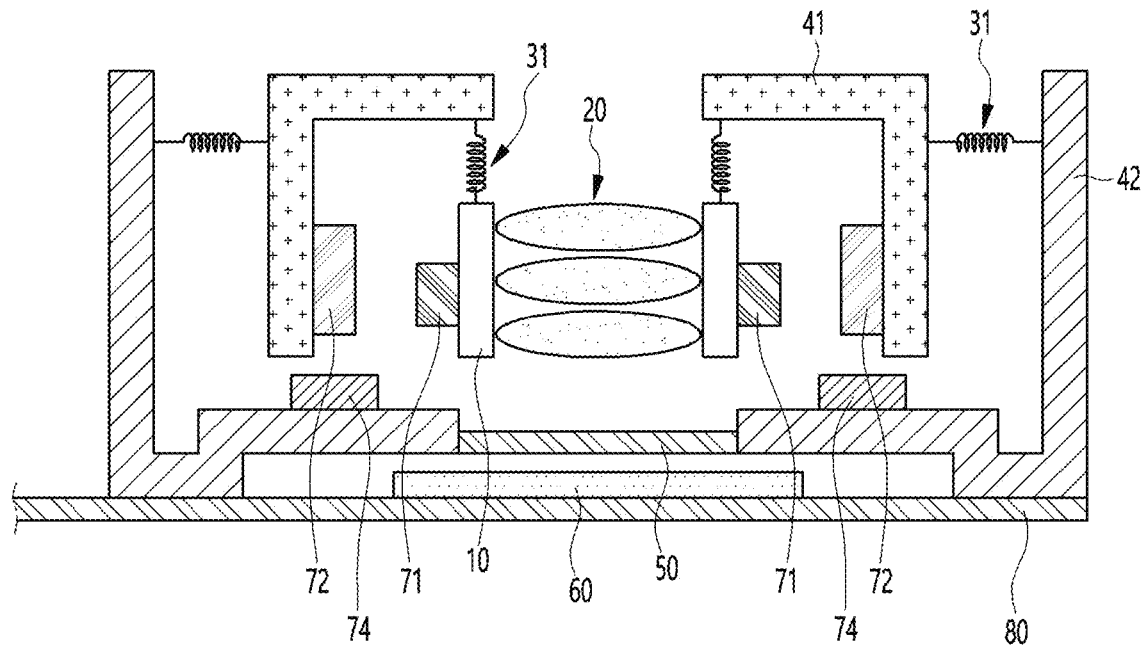
FIG. 1 is a view showing a camera module according to a comparative example.

FIG. 1 is a view showing a camera module according to Comparative Example.

A camera module having an optical image stabilizer (OIS) function and an Auto Focusing (AF) function requires at least two spring plates.

The camera module according to the comparative example may have two spring plates. The camera module according to the comparative example requires an elastic member such as at least six springs for the spring plate.

Referring to FIG. 1, the camera module according to the comparative example includes an optical system including a lens assembly, an infrared cut-off filter, and a sensor unit. That is, the camera module according to the comparative example includes a lens barrel 10, a lens assembly 20, a first elastic member 31, a second elastic member 32, a first housing 41, a housing 42, an infrared cut-off filter 50, a sensor unit 60, a circuit board 80, and drivers 71, 72, 73, and 74.

In this case, the lens barrel 10 is connected to the first housing 41. That is, the lens barrel 10 is connected to the first housing 41 via the first elastic member 31. That is, the lens barrel 10 is connected to the first housing 41 so as to be movable by the first elastic member 31. In this case, the first elastic member 31 includes a plurality of springs (not shown). For example, the first elastic member 31 connects between the lens barrel 10 and the first housing 41 at a plurality of points of the lens barrel 10.

The second elastic member 32 is connected to the first housing 41 and the second housing 42 accommodating the first housing 41. The second elastic member 32 fixes the first housing 41 to the second housing 42 so as to be movable. The second elastic member 32 includes a plurality of springs. In detail, the second elastic member 32 includes a plate-shaped spring.

In this case, the first elastic member 31 moves the lens barrel 10 relative to the sensor unit 60 in a vertical direction (a Z-axis direction) while supporting the lens barrel 10. To this end, the first elastic member 31 includes at least four springs.

In addition, the second elastic member 32 moves the lens barrel 10 relative to the sensor unit 60 in a horizontal direction (an X-axis direction and a Y-axis direction) while supporting the lens barrel 10. To this end, the second elastic member 32 includes at least two springs.

As described above, in the camera module according to the comparative example, OIS and AF are performed as the lens barrel 10 moves in X-axis, Y-axis, and Z-axis directions. To this end, the camera module according to the comparative example requires at least six elastic members such as springs. In addition, the camera module according to the comparative example requires two spring plates for supporting the elastic member as described above. Further, the camera module according to the comparative example requires an additional member such as an elastic wire for fixing the Z-axis of the lens barrel 10. Therefore, the camera module according to the comparative example has a complicated spring structure for moving the lens barrel in the X-axis, Y-axis and Z-axis directions.

In addition, in the camera module according to the comparative example, it is necessary to manually perform an operation of bonding the respective elastic members in order to couple the elastic member with the lens barrel 10. Accordingly, the camera module according to the comparative example has a complicated manufacturing process and requires a long manufacturing time.

In addition, the camera module according to the comparative example provides a tilt function of the lens barrel 10, but has a structure in which tilt correction of an image is substantially difficult. That is, even though the lens barrel 10 rotates with respect to the sensor unit 60, an image incident on the sensor unit 60 does not change, and thus the tilt correction of the image is difficult, and further, the tilt function itself is unnecessary.

Hereinafter, an image sensor substrate, a camera module, and a camera device including the same according to an embodiment will be described.

"Optical axis direction" used below is defined as an optical axis direction of a lens and/or an image sensor coupled to a lens driving device.

"Vertical direction" used below may be a direction parallel to the optical axis direction. The vertical direction may correspond to "z-axis direction". "Horizontal direction" used below may be a direction perpendicular to the vertical direction. That is, the horizontal direction may be a direction perpendicular to the optical axis. Therefore, the horizontal direction may include "x-axis direction" and "y-axis direction".

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor. Meanwhile, "auto focus" may correspond to "AF (Auto Focus)".

"Camera shake correction function" used below is defined as a function of moving the lens and/or the image sensor so as to cancel vibration (movement) generated in the image sensor by external force. Meanwhile, "Camera shake correction function" may correspond to "Optical Image Stabilization (OIS).

Figure 2:
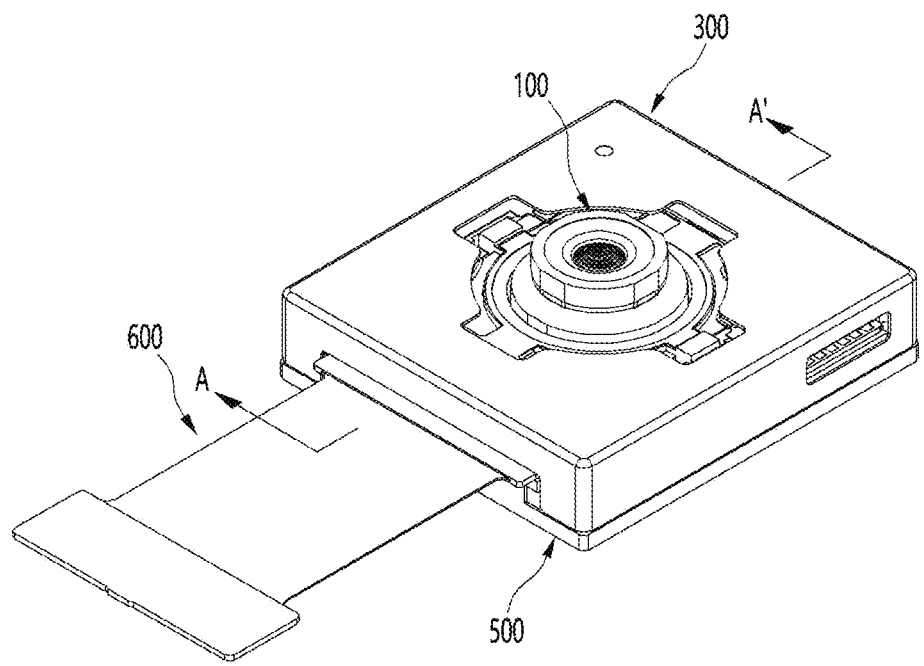
FIG. 2 is a perspective view of a camera device according to an embodiment.
Figure 3:
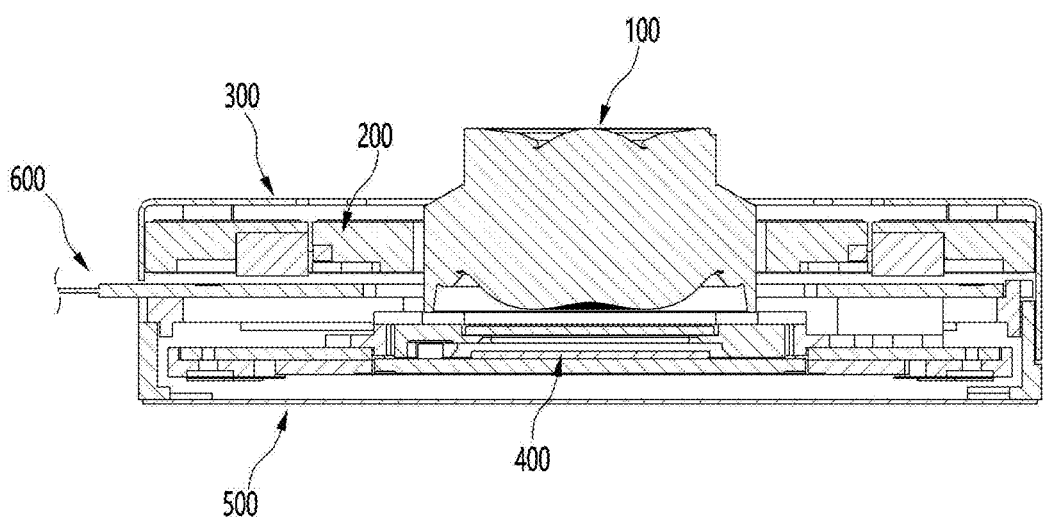
FIG. 3 is a cross-sectional view taken along line A-A in FIG. 2.
Figure 4:
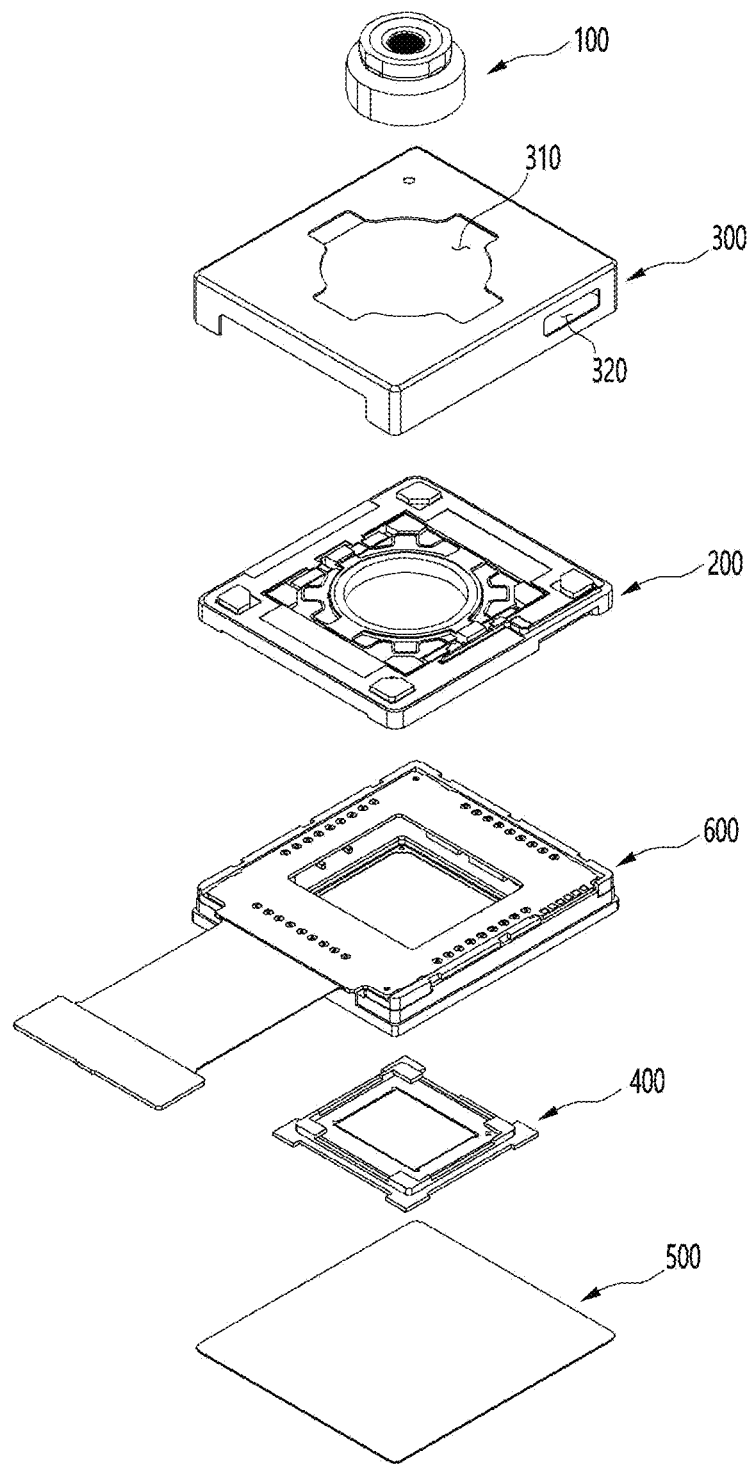
FIG. 4 is an exploded perspective view of the camera device according to the embodiment.

FIG. 2 is a perspective view of a camera device according to an embodiment, FIG. 3 is a cross-sectional view taken along line A-A of FIG. 2, and FIG. 4 is an exploded perspective view of the camera device to the embodiment.

The camera device in the embodiment may include a camera module. The camera device may include a lens driving device. Here, the lens driving device may be a voice coil motor (VCM). The lens driving device may be a lens driving motor. The lens driving device may be a lens driving actuator. The lens driving device may include an AF module. The lens driving device may include an OIS module.

<Camera Device>

A camera device may include a lens module 100.

The lens module 100 may include a lens and a lens barrel. The lens module 100 may include one or more lenses and a lens barrel capable of accommodating one or more lenses. However, one configuration of the lens module 100 is not limited to the lens barrel, and any holder structure that can support one or more lenses is possible. The lens module 100 is coupled to the first actuator 200 to move. The lens module 100 may be coupled to inside of the first actuator 200 as an example. Accordingly, the lens module 100 may move inside the first actuator 200 in response to a movement of the first actuator 200. The lens module 100 may be screw-coupled to the first actuator 200. As an example, the lens module 100 may be coupled to the first actuator 200 by an adhesive (not shown). Meanwhile, light passing through the lens module 100 may be irradiated to the image sensor. Meanwhile, the lens module 100 may include, for example, five lenses. The lens module 100 may include a liquid lens and a solid lens. The liquid lens contains conductive and non-conductive liquids, and an interface formed between the conductive liquid and the non-conductive liquid can be controlled by electrical force. The liquid lens may be a lens whose focal length is adjusted by adjusting the interface.

The camera device may include an actuator.

In detail, the camera device may include a first actuator 200 for shifting the lens module 100. The first actuator 200 may be an AF module. The first actuator 200 may move the lens module 100 in a vertical direction (obviously, an optical axis direction). That is, the first actuator 200 may perform an auto focus function by moving the lens module 100 in the optical axis direction.

A second actuator 600 may drive an image sensor 430. The second actuator 600 may tilt or rotate the image sensor 430. The second actuator 600 may move the image sensor 430. The second actuator 600 may move the image sensor 430 in a first direction perpendicular to an optical axis, move the image sensor 430 in a second direction perpendicular to the optical axis and the first direction, and rotate the image sensor 430 based on the optical axis. In this case, the first direction may be an x-axis direction, the second direction may be a y-axis direction, and the optical axis may be a z-axis direction.

Meanwhile, the first actuator 200 and the second actuator 600 may include a driver to move the lens module 100 and the image sensor 430, respectively. That is, the first actuator 200 may include a first driver (described later). In addition, the second actuator 600 may include a second driver (described later). Each of the first and second drivers may include a coil and a magnet. In addition, the coil and the magnet may generate an electromagnetic force therebetween to drive the lens module 100 and the image sensor 430, respectively.

The camera device may include cases 300 and 500.

The cases 300 and 500 may include a first case 300 and a second case 500. The first case 300 may be an upper case covering an upper region of the camera device. In this case, the first case 300 may be a shield can.

The first case 300 may be disposed surrounding side surfaces of the first actuator 200, the second actuator 600, and an image sensor module 400 constituting the camera device. A first open region 310 may be formed on an upper surface of the first case 300. The first open region 310 of the first case 300 may be a hollow hole. The lens module 100 coupled to the first actuator 200 may be disposed in the first open region 310 of the first case 300. In this case, the first open region 310 of the first case 300 may have a diameter larger than that of the lens module 100.

Specifically, the first case 300 may include a top plate and a plurality of side plates that are curved or bent at an edge of the top plate and extended downward. For example, the top plate of the first case 300 may have a quadrangular shape, thereby including four side plates extending downward from four edges of the top plate. For example, the first case 300 may be formed with the first open region 310 into which the lens module 100 is inserted on the upper surface thereof, and may have a rectangular parallelepiped shape in which a bottom surface thereof is opened and a corner is rounded.

Meanwhile, a second open region 320 may be formed on any one of four side plates of the first case 300. The second open region 320 may be an exposure hole that exposes a part of the configuration of the first actuator 200 disposed in the first case 300 to the outside. For example, the second open region 320 of the first case 300 may expose a terminal 262 of a flexible circuit board 260 of the first actuator 200. The second open region 320 may be an opening for soldering performed for coupling the terminal of the flexible circuit board 260 and a first substrate of a second actuator to be described later.

The second case 500 may be a lower case covering a lower region of the camera device. The second case 500 may block an opened lower region of the first case 300.

Each of the first actuator 200, the second actuator 600, and the image sensor module 400 constituting the camera device may be disposed in an accommodating space formed by the first case 300 and the second case 500.

The image sensor module 400 may be coupled to the second actuator 600. Preferably, the second actuator 600 may be composed of a fixed portion (to be described later) and a moving portion (described later). In addition, the moving portion of the second actuator 600 may be connected to the fixed portion through a wire (described later). The moving portion of the second actuator 600 may move with respect to the fixed portion by the electromagnetic force of the second driving portion. Here, the movement of the fixed portion may include all of the movement in the first direction, a movement in the second direction, and a movement in the optical axis direction.

In addition, the image sensor module 400 may be coupled to the moving portion of the second actuator 600. The image sensor module 400 may include an image sensor 440. The image sensor 440 may be any one of a charge coupled device (CCD), a metal oxide semi-conductor (MOS), a CPD, and a CID.

In the present embodiment, the image sensor 440 may be rotated around an x-axis, a y-axis, and a z-axis. The image sensor 440 may move around the x-axis, the y-axis, and the z-axis. The image sensor 440 may be tilted around the x-axis, the y-axis, and the z-axis.

That is, the image sensor module 400 is coupled to the moving portion of the second actuator 600, and when the moving portion of the second actuator 600 moves relative to the fixed portion of the second actuator 600, it is possible to move relative to the fixed portion of the second actuator 600 together with the moving portion of the second actuator 600. As a result, the camera shake correction function may be performed.

As described above, in the embodiment, an AF function may be performed through the first actuator 200 or the liquid lens of the lens module, and a camera shake correction function may be performed through the second actuator 600. Alternatively, the second actuator 600 may perform both the AF function and the camera shake correction function.

The camera device according to the present embodiment moves the image sensor module 400 relative to the lens module 100 to perform the camera shake correction function and/or the auto focus function.

That is, recently, as the camera technology has been developed, an image resolution has been increased, thereby increasing a size of the image sensor 440. At this time, as the size of the image sensor 440 increases, a size of the lens module 100 and parts of the actuator for shifting the lens module 100 are also increase. Accordingly, as a weight of the other actuator components for shifting the lens module 100 as well as the weight of the lens module 100 increases, it is difficult to stably shift the lens module 100 using the conventional VCM technology, and a lot of problems occur in terms of reliability.

Accordingly, in the present embodiment, AF is performed using the first actuator 200 implementing a lens shift method, and OIS is executed using the second actuator 600 implementing the image sensor shift method, thereby, the reliability of the camera device is improved.

Furthermore, there is a 5-axis camera shake in the camera shake of the camera device. For example, in the 5-axis camera shake, there are two camera shakes that are shaken at an angle, two camera shakes that is shaken by a shift, and one camera shake that are shaken by rotation. At this time, only the 4-axis camera shake correction is possible with the lens shift method, and the camera shake that are shaken in rotation cannot be corrected. This is because the camera shake caused by rotation should be corrected by rotation of the optical module, and even when the lens module 100 is rotated, an incident optical path is maintained as it is, and accordingly, the 5-axis camera shake correction is not possible with the lens shift method. Therefore, in the present embodiment, it is possible to solve a reliability problem of the lens shift method according to the development of the camera technology as described above, while applying the sensor shift method so as to enable the 5-axis camera shake correction.

Hereinafter, each configuration of the camera device according to the embodiment will be described in more detail.

<First Actuator>

Figure 5:
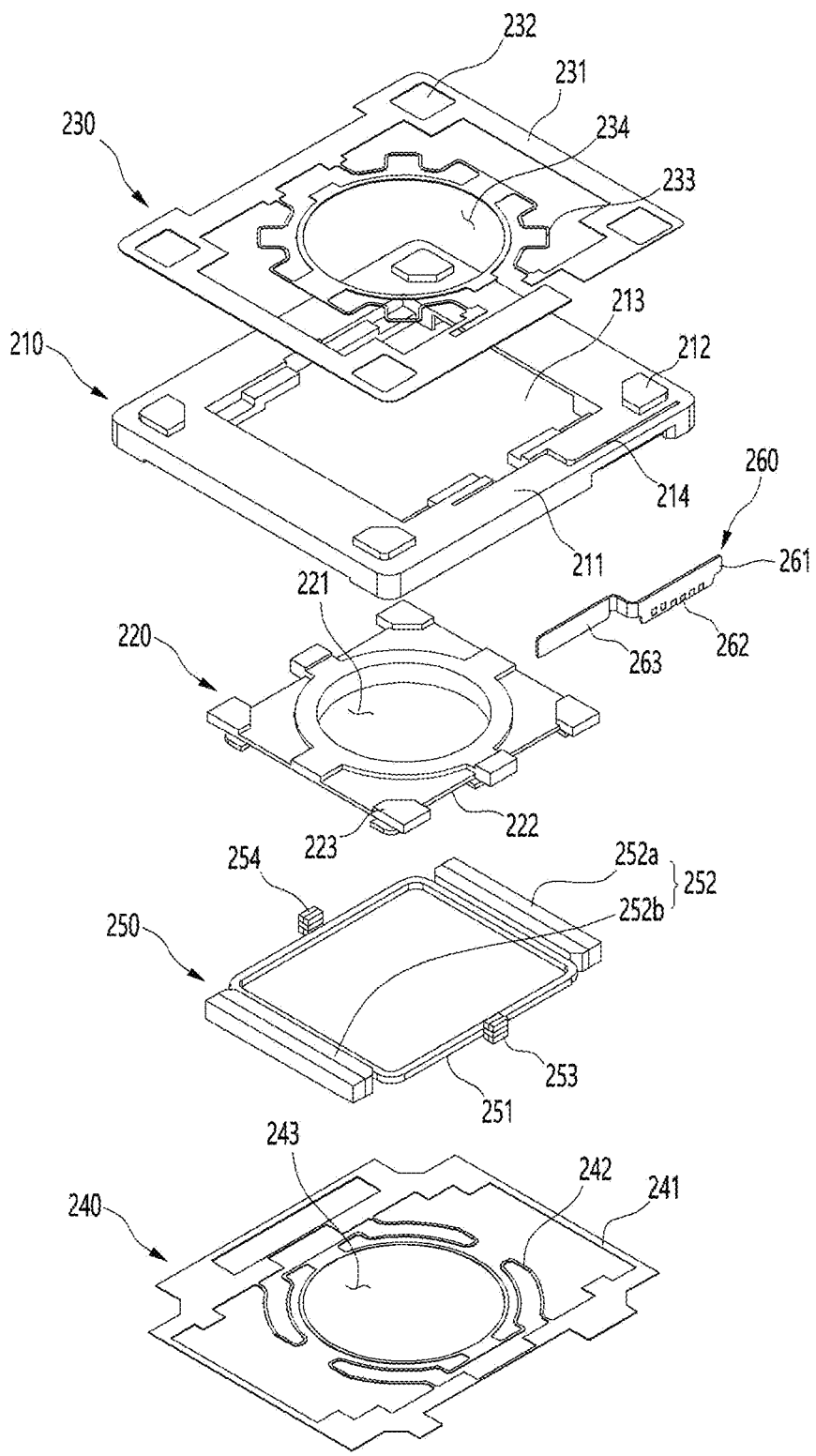
FIG. 5 is an exploded perspective view of a first actuator shown in FIG. 4.
Figure 6A:
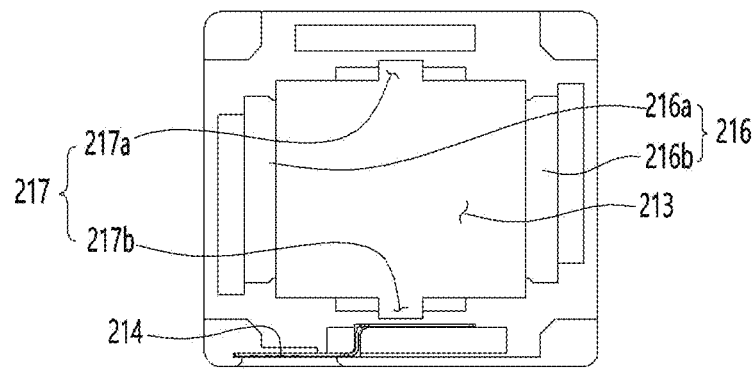
FIG. 6(a) is a plan view of a base of FIG. 5.
Figure 6B:
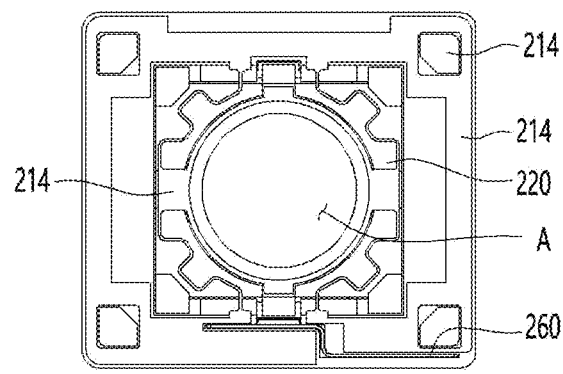
FIG. 6(b) is a plan view of the first actuator of FIG. 5.
Figure 6C:
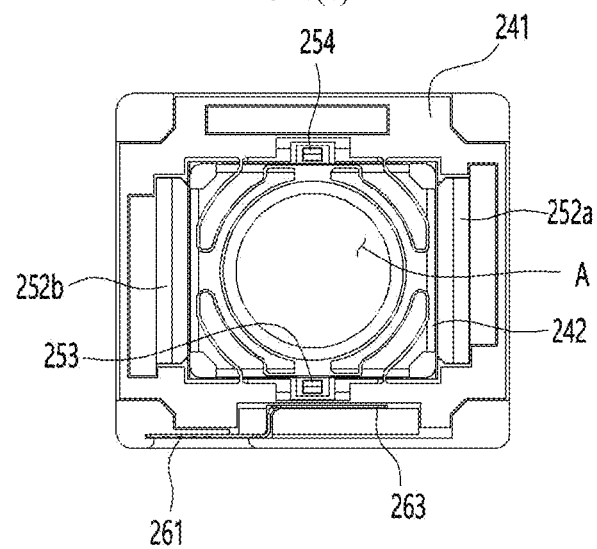
FIG. 6(c) is a bottom view of the first actuator of FIG. 5.

FIG. 5 is an exploded perspective view of a first actuator shown in FIG. 4, FIG. 6 (a) is a plan view of a base of FIG. 5, FIG. 6 (b) is a plan view of the first actuator of FIG. 5, and FIG. 6 (c) is a bottom view of the first actuator of FIG. 5.

Referring to FIGS. 5 and 6, a first actuator 200 may include a base 210, a bobbin 220, a first elastic member 230, a second elastic member 240, and a first driver 250.

In the first actuator 200 in an embodiment, the bobbin 220 may be elastically supported in a vertical direction by the base 210 via the first elastic member 230 and the second elastic member 240, and the bobbin 220 may move in the vertical direction by electromagnetic interaction of the first driver 250 disposed at the bobbin 220. Accordingly, the lens module 100 coupled to the bobbin 220 may move in the optical axis direction. In addition, an auto focus (AF) function may be performed as the lens module 100 moves in the optical axis direction.

The base 210 may be a fixing member of the first actuator 200. The base 210 may be disposed at an inner side of a first case 300 to be coupled to the first case 300.

The base 210 may include a body 211 having a first opening 213 formed at a center thereof. A shape of the body 211 may have a shape corresponding to the first case 300. For example, the shape of the body 211 of the base 210 may have a rectangular parallelepiped shape or a square cross-sectional shape corresponding to a shape of the first case 300.

A plurality of first protrusions 212 are formed on an upper surface of the body 211 of the base 210. The plurality of first protrusions 212 may formed protruding in an upward direction on the upper surface of the body 211. In addition, correspondingly, a plurality of lower protrusions (not shown) may be formed protruding in a downward direction on a lower surface of the body 211. The plurality of first protrusions 212 may be a fixing protrusion for fixing the first elastic member 230 disposed on the base 210. The plurality of first protrusions 212 may be disposed at four corner regions on the upper surface of the body 211 of the base 210.

A first opening 213 is formed in the body 211 of the base 210. The first opening 213 may have a shape corresponding to a shape of the bobbin 220. For example, the bobbin 220 may have a quadrangular plate shape, and accordingly, the first opening 213 may also have a quadrangular shape. However, the present embodiment is not limited thereto, and the bobbin 220 may have a cylindrical shape, and accordingly, the first opening 213 may also have a circular shape. A size of the first opening 213 may be larger than that of the bobbin 220. For example, in a state in which the bobbin 220 is inserted into the first opening 213, a predetermined gap may exist between an inner surface of the body 211 of the base 210 and an outer surface of the bobbin 220.

A stepped protrusion 215 may be formed on the inner surface of the body 211 of the base 210. The stepped protrusion 215 may limit movement of the bobbin 220 while selectively supporting the bobbin 220 disposed in the first opening 213. For example, the stepped protrusion 215 may function as a stopper for limiting movement of the bobbin 220 in a downward direction. That is, when the bobbin 220 in a normal state may not be in contact with the stepped protrusion 215 in a state in which the bobbin 220 is disposed in the first opening 213, and the bobbin 220 may be in contact with the stepped protrusion 215 when the bobbin 220 moves to a movement limit range in a downward direction.

Meanwhile, a first recess 217 recessed in an outward direction may be formed on the inner surface of the body 211 of the base 210. The first recess 217 may include a first-first recess 217a and a first-second recess 217b respectively formed on two inner surfaces facing each other of the inner surfaces of the body 211. At least a part of the bobbin 220 may be disposed in the first-first recess 217a and the first-second recess 217b. For example, a sensor magnet mounting portion (not shown) formed in the bobbin 220 may be disposed in the first-first recess 217a and the first-second recess 217b. The first-first recess 217a and the first-second recess 217b may be formed in order to minimize a distance between sensor magnets 253 and 254 mounted on the sensor magnet mounting portion of the bobbin 220 and a driver IC (not shown) mounted on the flexible circuit board 260.

A first driving magnet mounting groove 216 is formed in a region facing each other around the first opening 213 on the lower surface of the body 211 of the base 210. That is, a first-first driving magnet mounting groove 216a is formed in a first region of the lower surface of the body 211 of the base 210. In addition, a first-second driving magnet mounting groove 216b is formed in a second region facing the first region of the lower surface of the body 211 of the base 210. A first-first driving magnet 252b may be disposed in the first-first driving magnet mounting groove 216a, and a first-second driving magnet 252a may be disposed in the first-second driving magnet mounting groove 216b. In this case, the first actuator 200 according to the embodiment moves the bobbin 220 in the optical axis direction using two driving magnets 252a and 252b disposed to face each other. In this case, the first driving magnets 252a and 252b may be disposed extending long in a longitudinal direction in order to move the bobbin 220 in the optical axis direction by only the two first driving magnets 252a and 252b. In this case, the first driving magnets 252a and 252b may be disposed in a region other than a corner region of the lower surface of the body 211 in order to minimize a region overlapped with a second drive magnet (described later) of the second actuator 600 in the optical axis direction. In addition, the first driving magnets 252a and 252b may generate magnetic field interference with the second driving magnet of the second actuator 600. In this case, the first driving magnets 252a and 252b are disposed in a state in which the first driving magnets 252a and 252b are fixed to the body 211 of the base 210. In addition, the second driving magnet of the second actuator 600 is also disposed to be fixed to a fixed portion, not a moving portion. As described above, in the embodiment, the first driving magnets 252a and 252b and the second driving magnet are disposed at fixed positions, respectively. That is, in the embodiment, a coil is disposed at a portion moving depending on a lens shift and an image sensor shift, and accordingly, the driving magnets are continuously positioned in the fixed position, thereby minimizing magnetic interference with each other.

Meanwhile, the body 211 of the base 210 includes a substrate groove 214 into which the flexible circuit board 260 is inserted. In this case, the flexible circuit board 260 may be inserted into the substrate groove 214 vertically in an upright state. In this case, the substrate groove 214 may have a bent shape bent at least once. That is, the flexible circuit board 260 is inserted into the substrate groove 214, and in this case, a driver IC is disposed in the flexible circuit board 260. The driver IC may be a hall sensor built-in driver. Accordingly, the driver IC may sense a position of the lens module 100 by sensing a change in electric field magnitude that changes depending on positions of the sensor magnets 253 and 254, and accordingly, control an output signal.

In this case, the driver IC is disposed to face the sensor magnets 253 and 254. In this case, as a distance between the sensor magnets 253 and 254 and the driver IC is closer, accuracy of position sensing information of the bobbin 220 or the lens module 100 obtained via the driver IC may be improved. In addition, a terminal 262, which is electrically connected to a first substrate (described later) of the second actuator 600, is disposed in the flexible circuit board 260. In this case, in order to electrically connect between the terminal 262 and the first substrate, a process such as soldering should be performed. Accordingly, the terminal 262 should be positioned close to an outer surface of the base 210.

That is, the flexible circuit board 260 includes a first substrate region 261 in which the terminal 262 is disposed and a second substrate region 262 in which the driver IC is disposed. In addition, the flexible circuit board 260 has the first substrate region 261 positioned adjacent to the outer surface of the base 210 and the second substrate region 1263 positioned adjacent to an inner surface of the base 210, and to this end, a bent region may be included between the first and second substrate regions.

The bobbin 220 is disposed in the first opening 213 of the base 210.

A second opening 221 may be formed at a center of the bobbin 220. The second opening 221 may have a shape corresponding to the lens module 100. For example, the second opening 221 may have a circular shape corresponding to a shape of the lens module 100, but is not limited thereto. The bobbin 220 may be coupled to the lens module 100. For example, the lens module 100 may be inserted into the second opening 221 of the bobbin 220 and coupled to the bobbin 220.

A plurality of second protrusions 223 in contact with the first elastic member 230 may be formed on an upper surface of the bobbin 220. The plurality of second protrusions 223 may be a stopper that limits a movement range of the bobbin 220 in an upward direction while the bobbin 220 is elastically supported by the first elastic member 223. For example, when the bobbin 220 is out of the movement range in an upward direction, the second protrusion 223 is in contact with an inner surface of an upper surface of the first case 300 positioned in an upper portion of the bobbin 220 to limit the movement of the bobbin 220.

A coil winding portion 222 to which a first coil portion 251 is wound may be formed on the outer surface of the bobbin 220. For example, a coil winding portion 222 having a recessed shape recessed in an inward direction may be formed on the outer surface of the bobbin 220. In addition, the first coil portion 251 may be wound around the coil winding portion 222. The first coil portion 251 may be in the form of a "coil block". The first coil portion 251 may be an "electromagnet". The first coil portion 251 may be disposed to face the first driving magnets 252a and 252b, and accordingly, an electromagnetic force may be generated by electromagnetic interaction with the first driving magnets 252a and 252b. In this case, the first coil portion 251 may be electrically connected to the second elastic member 240. Accordingly, the first coil portion 251 may receive a current from the second elastic member 240 to generate an electromagnetic force. As a result, the bobbin 220 may move in an optical axis direction to perform an AF function.

A sensor magnet mounting portion (not shown) which protrudes in an inner surface direction of the base 210 and in which the sensor magnets 253 and 254 may be disposed may be formed on outer surfaces of the bobbin 220 other than the outer surfaces facing the first driving magnets 252a and 252b. In addition, the sensor magnets 253 and 254 may be mounted on the sensor magnet mounting portion and positioned in the first-first recess 217a and the first-second recess 217b of the base 210. The sensor magnets 253 and 254 move together with the bobbin 220 as the bobbin 220 moves. In addition, magnitude of the magnetic field sensed by the driver IC disposed on the flexible circuit board 260 may be changed depending on positions of the sensor magnets 253 and 254, and the driver IC may sense positions of the sensor magnets 253 and 254, further that of the bobbin 220, and further that of the lens module 100 based on a change in the magnitude of the changing magnetic field.

The first elastic member 230 is disposed above the base 210 and the bobbin 220. The second elastic member 240 is disposed below the base 210 and the bobbin 220. Accordingly, the bobbin 220 may be elastically supported in a vertical direction via the first elastic member 230 and the second elastic member 240 in the first opening of the base 210.

The first elastic member 230 may be a plate spring. The first elastic member 230 may be a metal. Alternatively, the first elastic member 230 may be nonmagnetic. Therefore, the first elastic member 230 may not be affected by a magnetic force of the first driving magnets 252a and 252b and an electromagnetic force of the first coil portion 251.

The first elastic member 230 may be disposed on the base 210. In addition, the first elastic member 230 may be disposed above the bobbin 220. The first elastic member 230 may be coupled to the base 210 and the bobbin 220. That is, the first elastic member 230 may include a first-first elastic portion 231 coupled to the base 210 and first-second elastic portion 233 extending from the first-first elastic portion 231 and coupled to the bobbin 220. A coupling groove 232 inserted into the plurality of first protrusions 212 disposed on the upper surface of the body 211 of the base 210 is formed in the first-first elastic portion 232. Accordingly, the first elastic member 230 may elastically support an upper side of the bobbin 220 in a state in which the coupling groove 232 is coupled to the first protrusion 212. In addition, the first elastic member 230 may include an opening 1234 into which the lens module 100 is inserted at a center thereof.

The second elastic member 240 may be disposed below the base 210. In addition, the second elastic member 240 may be disposed below the bobbin 220. The second elastic member 240 may be coupled to the base 210 and the bobbin 220. That is, the second elastic member 240 may include a second-first elastic portion 1241 coupled to the base 210 and a second-second elastic portion 242 coupled to the bobbin 220. Accordingly, the second elastic member 240 may elastically support a lower side of the bobbin 220 in a state in which the second elastic member 240 is coupled to the base 210. In addition, the second elastic member 240 may include an opening 243 into which the lens module 100 is inserted at a center thereof.

The second elastic member 240 may be electrically connected to the first coil portion 251. The second elastic member 240 may be electrically connected to the flexible circuit board 260. The second elastic member 240 may electrically connect the first coil portion 251 and the flexible circuit board 260. Therefore, in the flexible circuit board 260, a current may be supplied to the first coil portion 251 via the second elastic member 240. In this case, a direction, wavelength, intensity, etc. of the current supplied to the first coil portion 251 may be controlled.

<Second Actuator>

Hereinafter, the second actuator 600 will be described.

The second actuator 600 may be positioned under the first actuator 200 and operated separately from the first actuator 200 to shift the image sensor module 400.

To this end, the second actuator 600 may include a fixed portion 700 of which position is fixed, and a moving portion 800 of which position is moved by an electromagnetic force of a driver in a state in which the second actuator 600 is coupled to the fixed portion.

Figure 7:
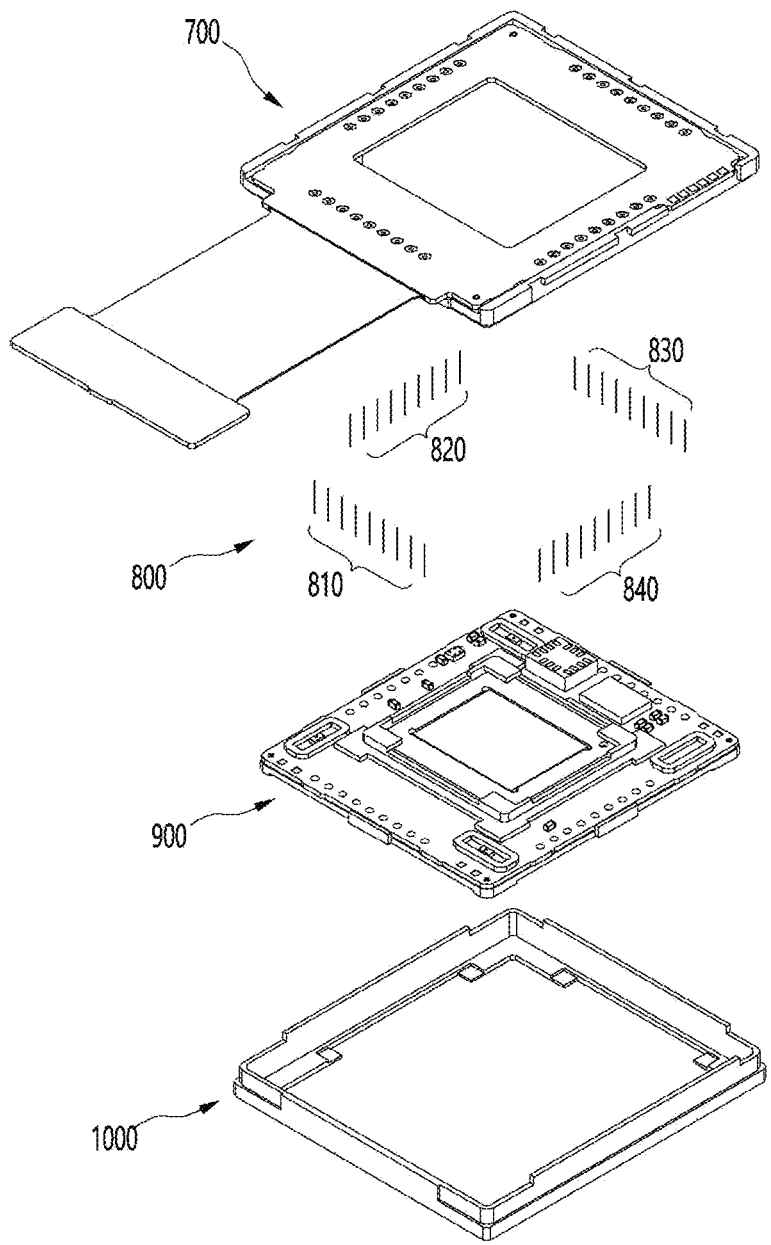
FIG. 7 is an exploded perspective view of a second actuator according to the embodiment.
Figure 8:
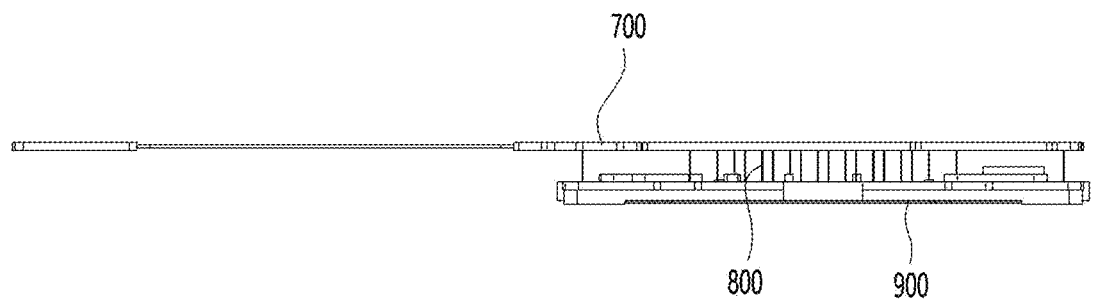
FIG. 8 is a cross-sectional view briefly illustrating a connection relationship between a first substrate and a moving portion in FIG. 7.
Figure 9:
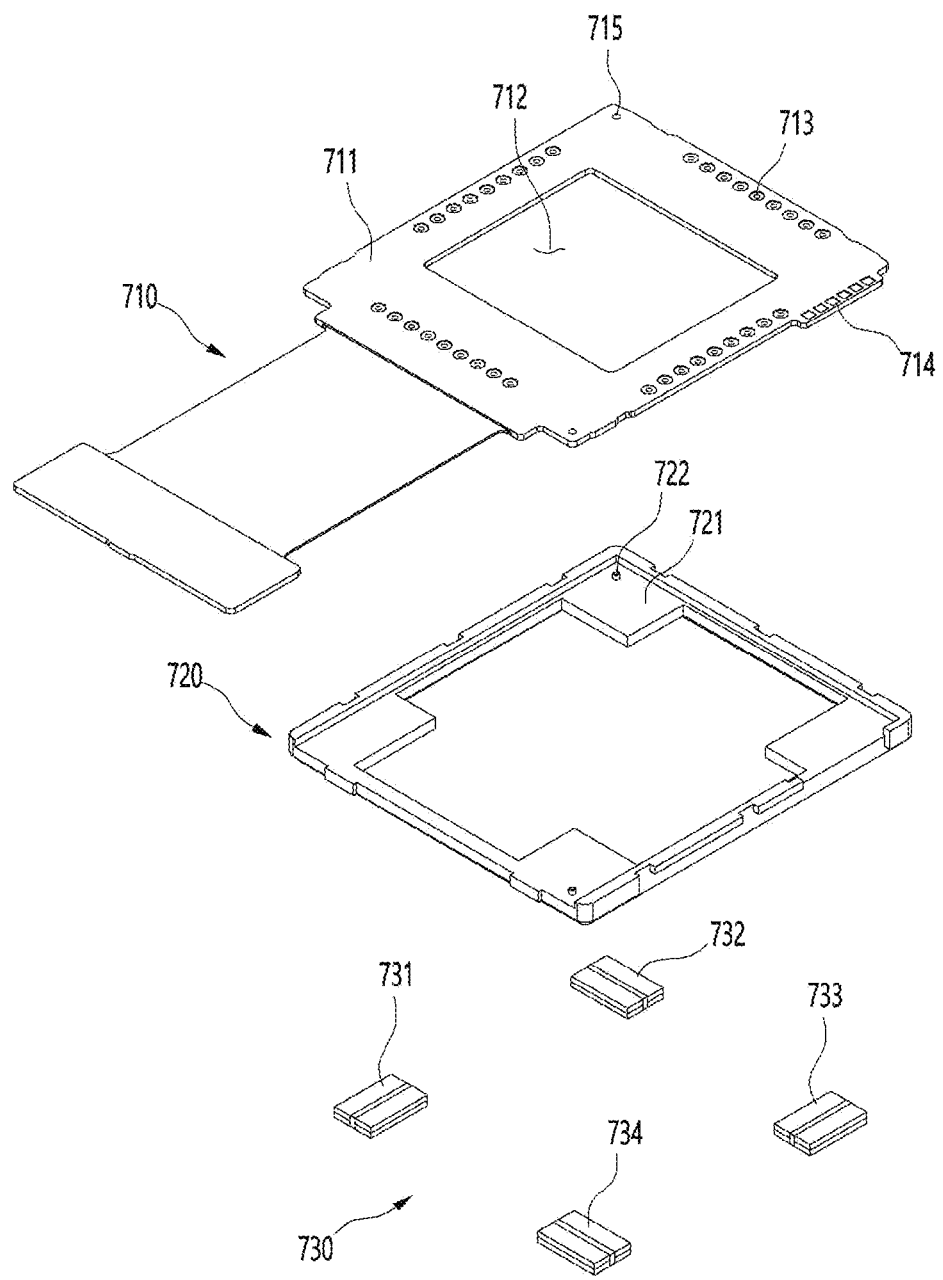
FIG. 9 is an exploded perspective view of a fixed portion of FIG. 7.
Figure 10:
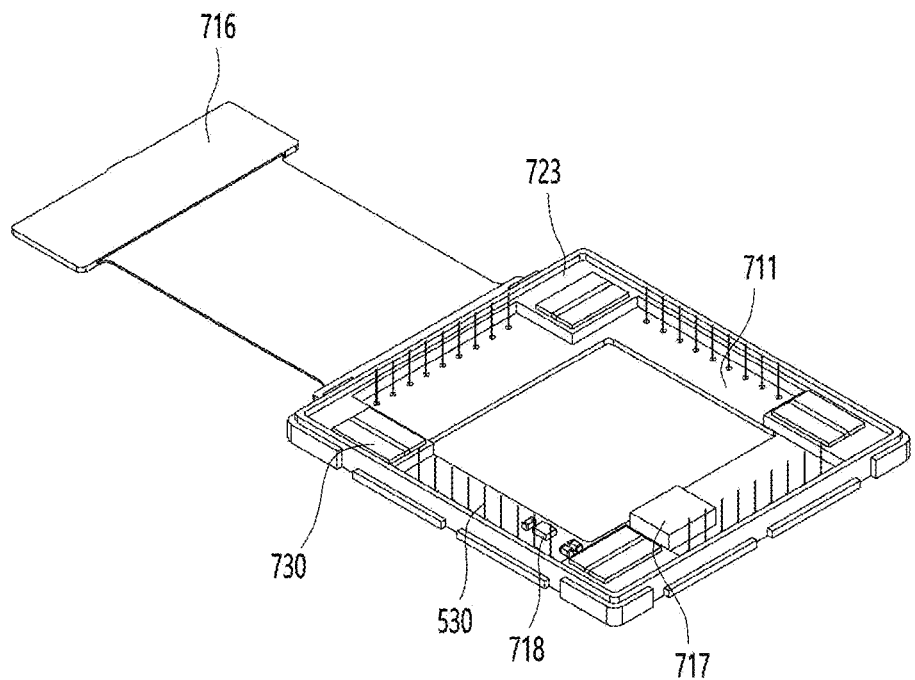
FIG. 10 is a bottom view of the fixed portion of FIG. 7.
Figure 11:
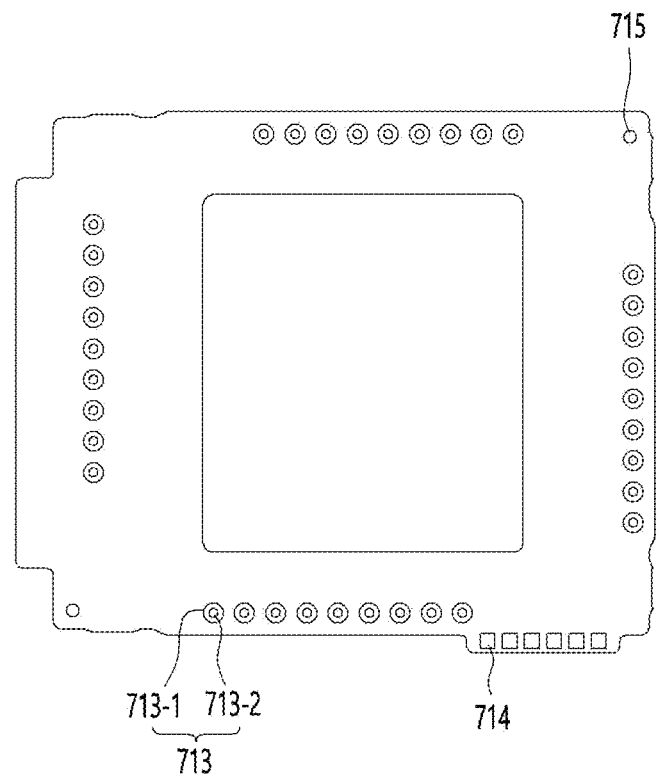
FIG. 11 is a view showing an upper surface of the first substrate in more detail.
Figure 12:
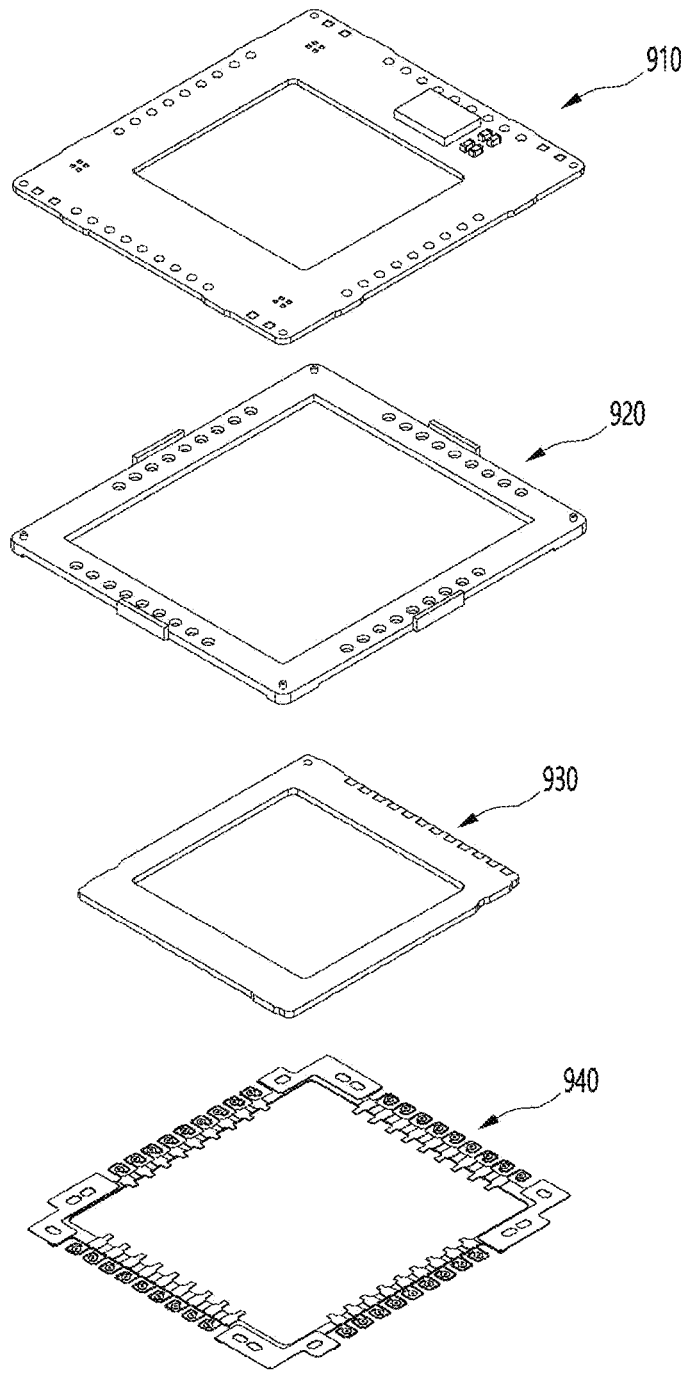
FIG. 12 is an exploded perspective view of the moving portion according to the embodiment.
Figure 13A:
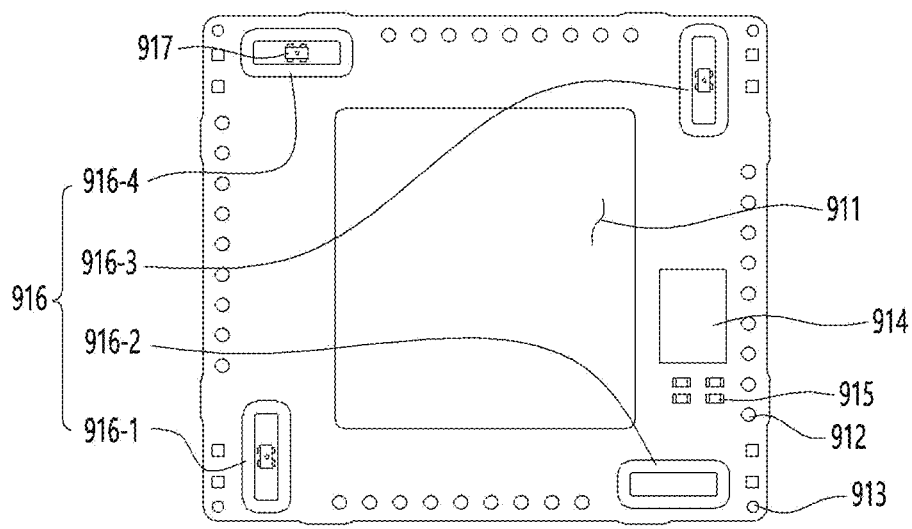
FIG. 13(a) is a plan view of a second substrate.
Figure 13B:
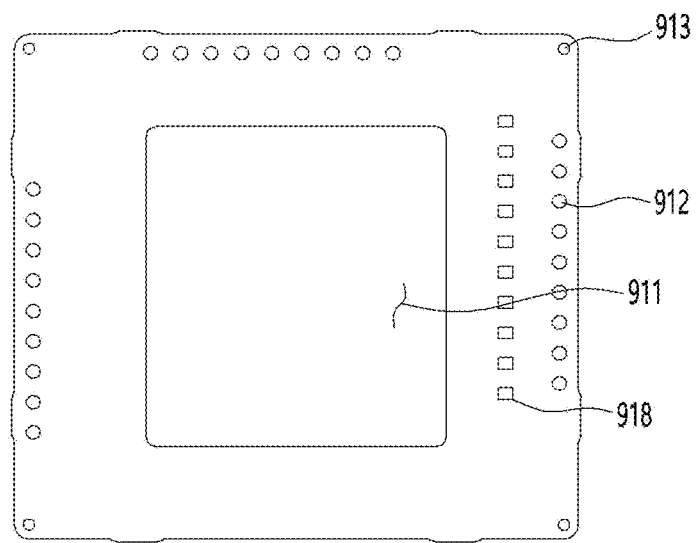
FIG. 13(b) is a bottom view of the second substrate.
Figure 14A:
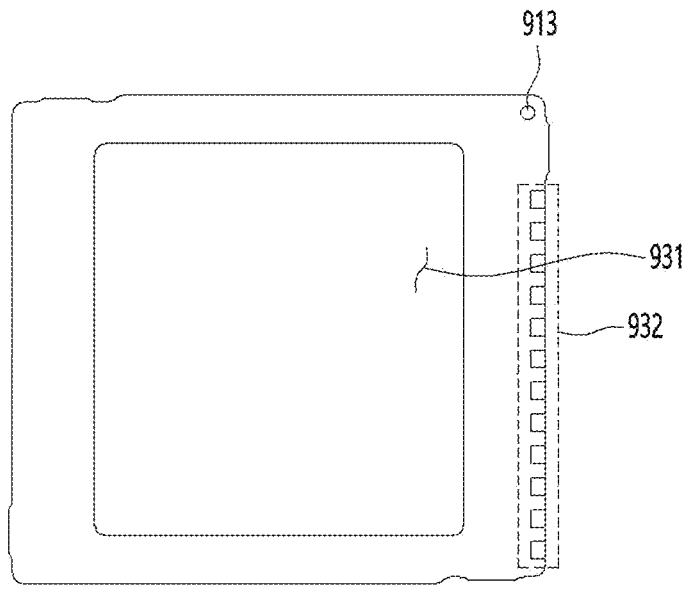
FIG. 14(a) is a plan view of a third substrate.
Figure 14B:
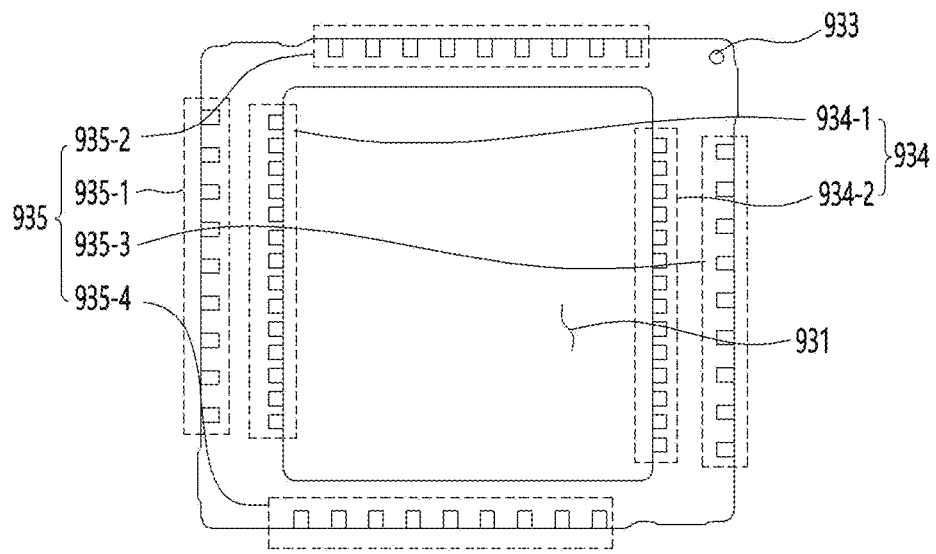
FIG. 14(b) is a bottom view of the third substrate.
Figure 15:
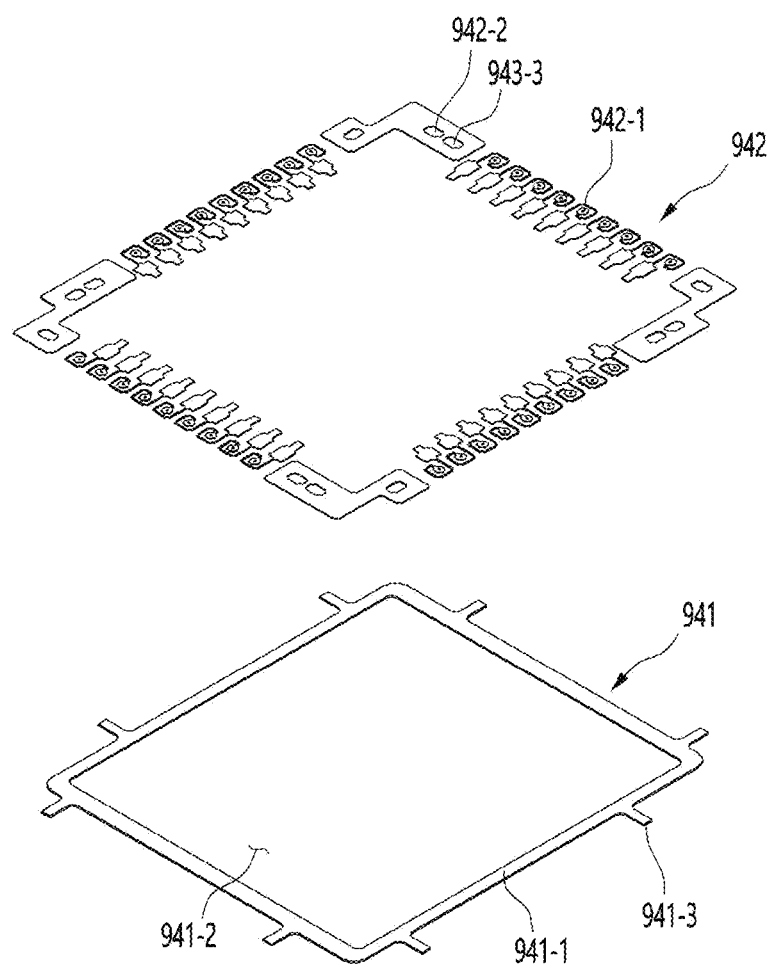
FIG. 15 is an exploded perspective view of a fourth substrate.
Figure 16:
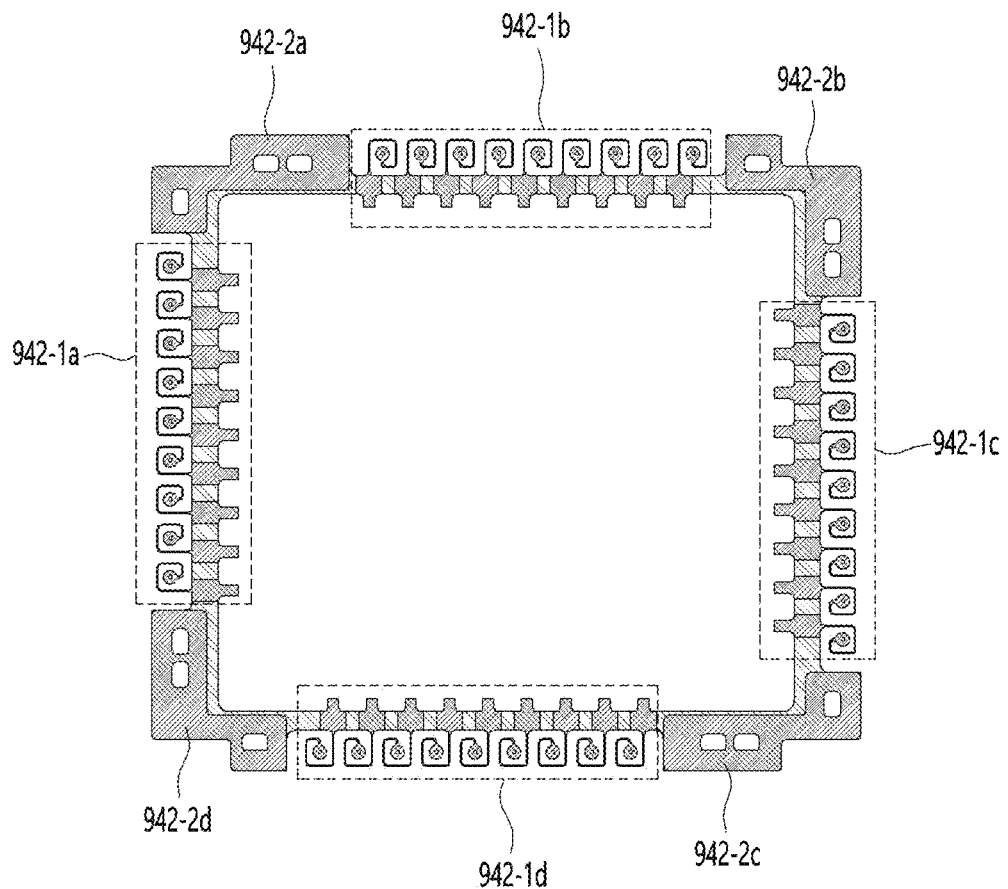
FIG. 16 is a plan view of the fourth substrate.
Figure 17:
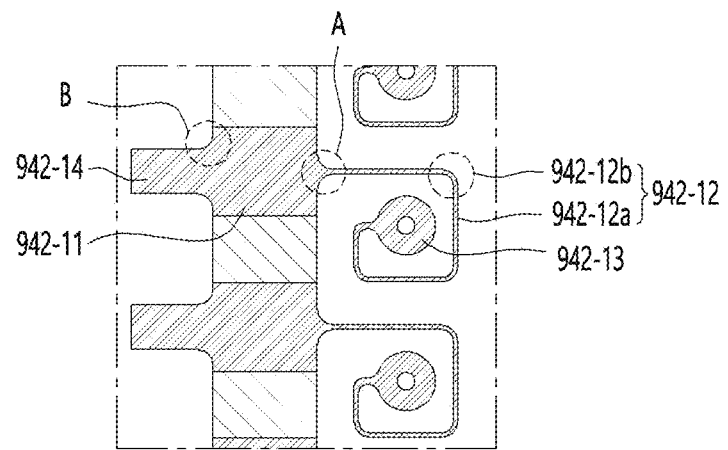
FIG. 17 is an enlarged view enlarging a specific region of FIG. 16.
Figure 18:
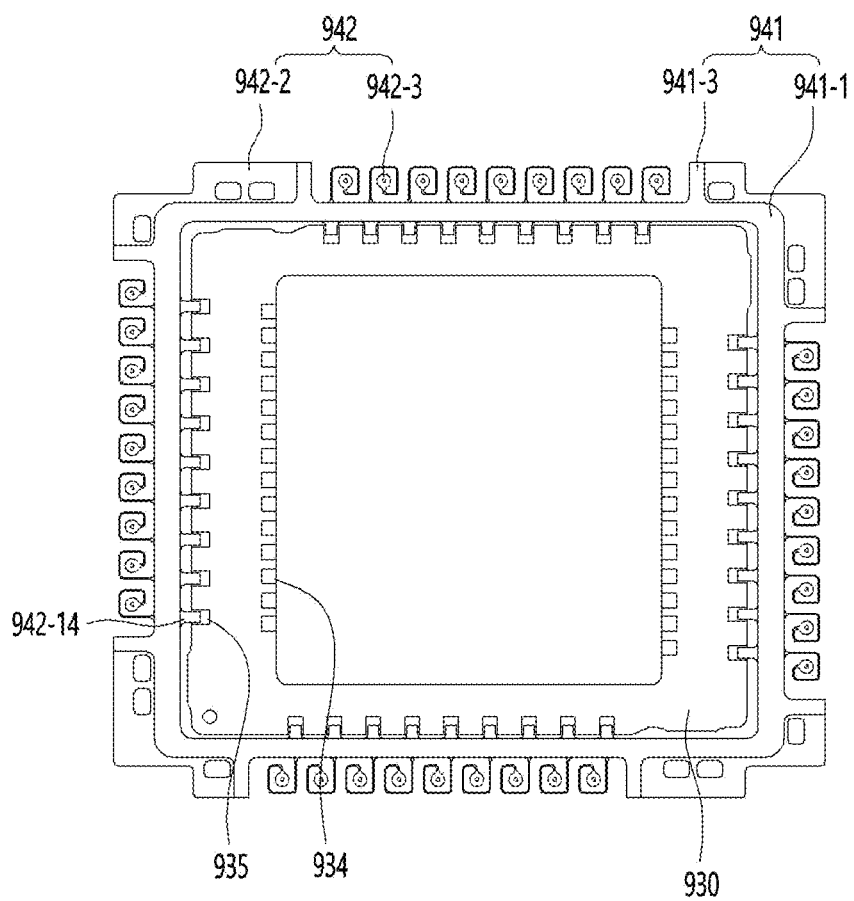
FIG. 18 is a connection view of the third substrate and the fourth substrate.

FIG. 7 is an exploded perspective view of a second actuator according to an embodiment, FIG. 8 is a cross-sectional view briefly illustrating a connection relationship between a first substrate and a moving portion in FIG. 7, FIG. 9 is an exploded perspective view of a fixed portion of FIG. 7, FIG. 10 is a bottom view of the fixed portion of FIG. 7, FIG. 11 is a view showing an upper surface of the first substrate in more detail, FIG. 12 is an exploded perspective view of the moving portion according to the embodiment, FIG. 13 (*a*) is a plan view of a second substrate, and FIG. 13 (*b*) is a bottom view of the second substrate, FIG. 14 (*a*) is a plan view of a third substrate, and FIG. 14 (*b*) is a bottom view of the third substrate, FIG. 15 is an exploded perspective view of a fourth substrate, FIG. 16 is a plan view of the fourth substrate, FIG. 17 is an enlarged view enlarging a specific region of FIG. 16, and FIG. 18 is a connection view of the third substrate and the fourth substrate.

Referring to FIGS. 7 to 17, the second actuator 600 may include a fixed substrate portion 700, a moving substrate portion 900, a connection wire 800, and a substrate housing 1000.

The fixed substrate portion 700 and the moving substrate portion 900 are electrically connected to each other by the connection wire 800. Here, a length of the connection wire 800 is larger than a sum of both thicknesses of the fixed substrate portion 700 and the moving substrate portion 900. Accordingly, the moving substrate portion 900 disposed below the fixed substrate portion 700 is positioned at a predetermined distance from the fixed substrate portion 700. That is, the moving substrate portion 900 may move relative to the fixed substrate portion 700 by an electromagnetic force generated by the magnet portion and the coil portion to be described later in the suspended state (flown state) to a lower portion of the fixed substrate portion 700 by the connection wire 800.

The connection wire 800 may connect the fixed substrate portion 700 and the moving substrate portion 900. The connection wire 800 may have elasticity. The connection wire 800 may be an elastic member. The connection wire 800 may be a wire spring. The connection wire 800 may connect between a circuit pattern portion of the fixed substrate portion 700 and a circuit pattern portion of the moving substrate portion 900 in a state in which the fixed substrate portion 700 is spaced apart from the moving substrate portion 900 at a predetermined interval. The connection wire 800 may be formed of metal. The connection wire 800 may elastically support a movement of the moving substrate portion 900.

The connection wire 800 may include a plurality of wires. The plurality of wires may correspond to the number of channels of signals exchanged between the moving substrate portion 900 and the fixed substrate portion 700. The connection wire 800 may include a total of thirty-six wires, nine each on side surface between adjacent corners of the four corners of the fixed substrate portion 700 and the moving substrate portion 900.

For example, the connection wire 800 may include nine first wires 810 disposed on each of first side surfaces of the fixed substrate portion 700 and the moving substrate portion 900, nine second wires 820 disposed on a second side surface, nine third wires 830 disposed on a third side surface, and nine fourth wires 840 disposed on the fourth side surface.

As described above, the connection wire 800 may be evenly distributed on four side surfaces. That is, the connection wire 800 may form a symmetrical structure with side surfaces facing each other at the four side surfaces. In this case, the connection wire 800 should elastically support the moving substrate portion 900 with respect to the fixed substrate portion 700 while transmitting a signal. In this case, when the connection wire 800 is asymmetrically disposed, the moving substrate portion 900 may not perform a normal shift operation, a difference occurs in an amount of movement between a portion in which the connection wire is disposed a lot and other portions, and accordingly, problems in operation reliability may occur. Therefore, in an embodiment, the connection wire 800 are circularly disposed evenly in each region to improve reliability of the image sensor shift operation.

The substrate housing 1000 is disposed below the fixed substrate portion 700 to accommodate the moving substrate portion 900 therein.

The second actuator 600 configured as described above will be specifically described as follows.

The fixed substrate portion 700 may include a first substrate 710, a magnet holder 720, and a magnet portion 730.

The first substrate 710 may include a first substrate region 711 in which a first opening 712 at a center thereof is formed, and a second substrate region 716 in which a connector extending from the first substrate region 711 and connected to an external device is disposed.

The first substrate 710 may include a first lead pattern portion 713 disposed in the first substrate region 711. The first substrate 710 may be coupled to the connection wire 800 in the first lead pattern portion 713. That is, one end of the connection wire 800 may be coupled to the first lead pattern portion 713 of the first substrate 710. A coupling of the first lead pattern portion 713 and the connection wire 800 may be performed via soldering. The first lead pattern portion 713 may be a portion in which a solder resist is opened for electrical connection with the connection wire 800.

In detail, the first lead pattern portion 713 includes a first hole 713-2 and a first lead pattern portion 713-3 disposed surrounding the first hole 713-2. That is, the first lead pattern portion 713 may be a pad including the first hole 713-2 through which the connection wire 800 passes. Accordingly, the connection wire 800 may be soldered in a state in which the connection wire 800 is passing through the first hole 713-2 to be electrically connected to the lead pattern portion 713-1 disposed around the first hole 713-2.

The first lead pattern portion 713 is configured in plurality. That is, the first lead pattern portion 713 includes a plurality of first lead patterns. In addition, the plurality of first lead patterns are connected to the connection wire 800. In this case, the number of the first lead patterns may be equal to or less than the number of the connection wires 800. When the number of the first lead patterns is the same as the number of the connection wires 800, all of the first lead patterns may be coupled to the connection wires. In addition, when the number of first lead patterns is less than the number of the connection wires 800, at least one of the first lead patterns may not be coupled to the connection wire.

The connector may be disposed in the second substrate region 716 connected to the first substrate region 711. The connector may be a port for electrically connecting with the external device.

In this case, the first substrate region 711 may be disposed in the camera device, and the second substrate region 716 may extend from the first substrate region 711 to be exposed to outside the camera device.

That is, the first substrate region 711 may be disposed inside the first case 300, and the second substrate region 716 may be disposed outside the first case 300 to include the connector connected to the external device.

The first substrate 710 may transmit a signal to the moving substrate portion 900, or may receive the signal transmitted from the moving substrate portion 900. That is, the first substrate 710 is electrically connected to the moving substrate portion 900 via a connection wire 800, and accordingly, a power signal or a communication signal may be transmitted to the moving substrate portion 900 via the connection wire 800, and information including an image signal obtained by the moving substrate portion 900 may be received.

A first pad portion 714 may be disposed in an edge region of the first substrate region 711 of the first substrate 710. The first pad portion 714 may be electrically connected to the flexible circuit board 260 included in the first actuator 200.

At least one first coupling hole 715 is formed in a corner region of the first substrate region 711 of the first substrate 710. The first coupling hole 715 may be formed to fix the first substrate 710 on the magnet holder 720.

The first substrate 710 may be positioned in a fixed state within the first case 300 of the camera device. That is, the first substrate 710 may be disposed in a fixed state without moving.

The magnet holder 720 is disposed below the first substrate 710. The magnet holder 720 may be provided with a substrate seating portion 721 on which the first substrate 710 is seated. In addition, a first coupling protrusion 722 coupling to the first coupling hole 715 formed in the first substrate 710 may be formed in the substrate seating portion 721.

The first substrate 710 may be seated on the substrate seating portion 721 in the state in which the first coupling hole 715 is inserted into the first coupling protrusion 722.

In this case, the magnet holder 720 may include an open region overlapping the first opening 712 of the first substrate 710 in an optical axis direction. In addition, in the magnet holder 720, a position overlapped in the optical axis direction with the first lead pattern portion 713 formed in the first actuator 200 may be opened.

A gyro sensor 717 may be disposed on a lower surface of the first substrate 710. That is, the gyro sensor 717 according to the present embodiment may be disposed on a lower surface of the first substrate 710 and accommodated in the first case 300 of the camera device.

That is, in the present embodiment, the gyro sensor 717 for implementing an anti-shake function may be built in a state mounted on the lower surface of the first substrate 710, so that an angular velocity/linear velocity sensing information due to a camera shake may be fed back to the moving substrate portion 900. Accordingly, in an embodiment, the gyro sensor 717 is disposed in a space between the first substrate 710 and the moving substrate portion 900, and thus there is an effect in which it is not necessary to provide an additional space for disposing the gyro sensor 717.

A magnet-seating groove (not shown) in which the magnet portion 730 is disposed may be formed on a lower surface of the magnet holder 720. The magnet portion 730 may be disposed in the magnet-seating groove of the magnet holder 720. In this case, the magnet portion 730 may be disposed to face a coil portion 916 disposed on the moving substrate portion 900. In this case, when a current is applied to the coil portion 916, an electric field may be formed around the coil portion 916. When the current is applied to the coil portion 916, the coil portion 916 may move relative to the magnet portion 730 via electromagnetic interaction between the coil portion 916 and the magnet portion 730.

In this case, the magnet portion 730 may be disposed at a corner of the lower surface of the magnet holder 720. That is, the magnet portion 730 may be disposed at four corners of the lower surface of the magnet holder 720, respectively. In addition, the magnet portion 730 may face the coil. The magnet portion 730 may be a flat plate magnet having a flat plate shape.

The magnet portion 730 may include a plurality of magnets. The magnet portion 730 may include four magnets. The magnet portion 730 may include first to fourth magnets 731, 732, 733, and 734.

*The first magnet 731 may face a first coil 916-1 disposed on the moving substrate portion 900. The first magnet 731 may be disposed at a first corner disposed on an upper left side of the magnet holder 720.

The second magnet 732 may face a second coil 916-2 disposed on the moving substrate portion 900. The second magnet 732 may be disposed at a second corner disposed on an upper right side of the magnet holder 720.

The third magnet 733 may face a third coil 916-3 disposed on the moving substrate portion 900. The third magnet 733 may be disposed at a third corner disposed at a lower right side of the magnet holder 720.

The fourth magnet 734 may face a fourth coil 916-4 disposed on the moving substrate portion 900. The fourth magnet may be disposed at a fourth corner disposed at a lower left side of the magnet holder 720.

Each of the magnets constituting the magnet portion 730 may be disposed to be perpendicular to adjacent magnets, and may be disposed to be parallel to magnets disposed in a diagonal direction.

Here, polarity of a surface that faces the coil portion 916 of the surfaces of the first magnet 731 from a portion close to one side and a portion close to the other side surface may be different. In addition, polarity of a surface that faces the coil portion 916 of the second magnet 732 from a portion close to one side and a portion close to the other side surface may be different. Further, polarity of a surface that faces the coil portion 916 of the third magnet 733 from a portion close to one side and a portion close to the other side surface may be different.

Polarity of a surface that faces the coil portion 916 of the fourth magnet 734 from a portion close to one side and a portion close to the other side surface may be different.

In addition, the first magnet 731 and the third magnet 733 may be disposed in a same direction, and the second magnet 732 and the fourth magnet 734 may be disposed in the same direction.

The first magnet 731 may be disposed perpendicularly to the second magnet 732. Polarities of inner side portions of the first to fourth magnets 731, 732, 733, and 734 may be the same. Polarities of outer side portions of the first to fourth magnets 731, 732, 733, and 734 may be the same. Each of the polarities of inner portions of the first to fourth magnets 731, 732, 733, and 734 may be formed as an N pole. Each of the polarities of outer portions of the first to fourth magnets 731, 732, 733, and 734 may be formed as an S pole. However, as a modified example, each of the polarities of inner portions of the first to fourth magnets 731, 732, 733, and 734 may be formed as an S pole and each of the polarities of outer portions thereof may be formed as an N pole.

Meanwhile, as shown in FIG. 10, one end of the connection wire 800 may be coupled to the first lead pattern portion 713 of the first substrate 710, and pass through the first hole 713-2 constituting the first lead pattern portion 713 so as to extend to a lower portion of the first substrate 710.

As described above, the fixed substrate portion 700 may be configured such that the first substrate 710 is disposed on an upper surface of the magnet holder 720, and the magnet portion 730 is disposed on the lower surface thereof, based on the magnet holder 720. In addition, a gyro sensor obtaining sensing information necessary to perform camera shake correction may be disposed on the lower surface of the first substrate 710, and the signal obtained via the gyro sensor may be delivered to the moving substrate portion 900 via the connection wire 800.

*A substrate housing 1000 may be disposed below the fixed substrate portion 700. The substrate housing 1000 is coupled below the fixed substrate portion 700. Preferably, the substrate housing 1000 may be provided with a seating portion (not shown) on which the magnet holder 720 constituting the fixed substrate portion 700 is mounted, and accordingly, the seating portion (not shown) may be coupled to the magnet holder 720. In addition, the moving substrate portion 900 is disposed in the substrate housing 1000 coupled to the magnet holder 720.

The moving substrate portion 900 may be electrically connected to the fixed substrate portion 700 via the connection wire 800, and move relative to the fixed substrate portion 700 by interaction between the magnet portion 730 and the coil portion 916.

To this end, the moving substrate portion 900 may include a second substrate 910, a substrate holder 920, a third substrate 930, and a fourth substrate 940. Here, that is, the second substrate 910, the third substrate 930, and the fourth substrate 940 may be a second substrate portion constituting the movable substrate 900. In addition, the first substrate 710 may be a first substrate unit constituting the fixed substrate portion 700.

The second substrate 910 may be a main substrate. The second substrate 910 may be a driving substrate for driving the second actuator.

The second substrate 910 may include a second opening 911. In this case, the second opening 911 may be overlapped with the first opening 712 formed in the first substrate 710 in an optical axis direction.

The second substrate 910 may include a coil portion 916 disposed at each corner of the second substrate 910. The coil portion 916 may be electrically connected to the second substrate 910. The coil portion 916 may be disposed to face the magnet portion 730 disposed in the first actuator 200. When a current is applied to the coil portion 916, an electric field may be formed therearound.

The coil portion 916 may include four coils. In this case, current may be independently applied to at least three coils of the four coils. In the first embodiment, the coil portion 916 may be controlled by three channels. Alternatively, in the embodiment, the coil portion 916 may be controlled by four individual channels. The four coils constituting the coil portion 916 may be electrically separated from each other. Any one of the forward current and the reverse current may be selectively applied to each of the four coils of the coil portion 916. In the present embodiment, only three of the four coils may be electrically separated and one coil may be electrically connected to another coil. Alternatively, all four coils may be electrically separated. When only three of the four coils are electrically separated, a total of six lead wires in three pairs may come out of the coil portion 916, and when all four coils are electrically separated, a total of eight lead wires in four pairs may come out of the coil portion 916.

When four coils are controlled by three channels as in the first embodiment of the present embodiment, a pair of the coil portion 916 and the magnet portion 730 should be driven in a z-axis-centered rotational drive, but when four coils are controlled by four channels as in the embodiment, the coil portion 916 and the magnet portion 730 may be driven in two pairs in the z-axis-centered rotational drive.

The coil portion 916 may include first to fourth coils 916-1, 916-2, 916-3, and 913-4. In addition, each of the first to fourth coils 916-1, 916-2, 916-3, and 913-4 may be disposed to face each magnet of the magnet portion 730 disposed on the first substrate 710.

The first coil 916-1 may be disposed at a first corner of the second substrate 910. The second coil 916-2 may be disposed at a second corner of the second substrate 910. The third coil 916-3 may be disposed at a third corner of the second substrate 910. The fourth coil 916-4 may be disposed at a fourth corner of the second substrate 910. The first coil 916-1 and the third coil 916-3 may be disposed on a first diagonal direction of the second substrate 910, and the second coil 916-1 and the fourth coil 916-4 may be disposed on a second diagonal direction of the second substrate 910.

In the present embodiment, the first coil 916-1 and the third coil 916-3 may be disposed to be elongated in a first direction, and the second coil 916-2 and the fourth coil 916-4 may be disposed to be elongated in a second direction. In this case, the first direction and the second direction may be vertical. A long side of the first coil 916-1 and a long side of the third coil 916-3 may be disposed in parallel with each other. A long side of the second coil 916-2 and a long side of the fourth coil 916-4 may be disposed in parallel to each other. The long side of the first coil 916-1 and the long side of the second coil 916-2 may not be parallel to each other.

In this case, the long side of the first coil 916-1 and the long side of the second coil 916-2 may be disposed such that the virtual extension lines thereof are orthogonal to each other. A disposition direction of the first coil 916-1 and a disposition direction of the second coil 916-2 may be orthogonal to each other.

In the present embodiment, a current may be independently applied to at least three coils among the first to fourth coils 916-1, 916-2, 916-3, and 916-4. The first to fourth coils 916-1, 916-2, 916-3, and 916-4 may be electrically separated from each other.

Meanwhile, hall sensors 917 may be disposed at inner sides of the first to fourth coils 916-1, 916-2, 916-3, and 916-4. In this case, the hall sensors 917 may be disposed only at inner sides of three coils among the first to fourth coils 916-1, 916-2, 916-3, and 916-4. This is because, in the first embodiment, since the first to fourth coils 916-1, 916-2, 916-3, and 916-4 are controlled by three channels, one coil may not necessarily have a hall sensor. The hall sensor 917 may sense a magnetic force of the magnet portion 730. A movement of the image sensor module may be identified in real time via a magnetic force of the magnet portion 730 sensed by the hall sensor 917. In addition, this may allow an optical image stabilization (OIS) feedback control.

The hall sensor 917 may be configured in plural. That is, as described above, the hall sensor 917 may include three sensors. A movement in the x-axis direction, a movement in the y-axis direction, and a rotation around the z-axis of the image sensor 440 may be sensed via the three sensors. The hall sensor 917 may include first to third sensors. The first sensor may face the first magnet, the second sensor may face the second magnet, and the third sensor may face the third magnet.

The hall sensor 917 may include a first hall sensor for sensing an x-axis movement amount and/or displacement in the magnet portion 730. The hall sensor 917 may include a second hall sensor for sensing a y-axis movement amount and/or displacement of the magnet portion 730. The hall sensor 917 may include a third hall sensor for sensing the x-axis movement amount and/or displacement or the y-axis movement amount and/or displacement of the magnet portion 730. A movement of the magnet portion 730 rotating around the z-axis may be sensed via at least two of the first hall sensor, the second hall sensor, and the third hall sensor.

A driver IC 914 for controlling an operation of the second actuator may be disposed on the second substrate 910. In addition, various passive elements 915 for operating the second actuator may be disposed on the second substrate 910.

In this case, the second substrate 910 should connect the coil portion 916, the driver IC 914, and the passive elements 915 to each other, and then to the first substrate 710. Here, a terminal may be in twelve required for the electrical connection from the second substrate 910 to the first substrate 710. The twelve terminals may be terminals connected to the driver IC 914.

Accordingly, a plurality of second pad portions 918 connected to the driver IC 914 are disposed on a lower surface of the second substrate 910. The number of the plurality of second pad portions 918 may be configured to be in twelve for transmitting and receiving necessary signals while controlling the configurations disposed on the second substrate 910 in the driver IC 914.

Meanwhile, a second hole 912 may be formed in an edge region of the second substrate 910. In this case, the second hole 912 may be aligned with the first hole 713-2 formed in the first substrate 710 in an optical axis direction. The second hole 912 may be a wire through-hole through which the connection wire 800 coupled to the first substrate 710 passes.

In addition, a third coupling hole 913 is formed at an edge of the second substrate 910.

The second substrate 910 is disposed on the substrate holder 920.

In this case, the substrate holder 920 includes a guide protrusion 921 extending in an upward direction at an edge region thereof. The guide protrusion 921 may be formed on an upper surface of the substrate holder 920. The guide protrusion 921 may guide an assembly position of the second substrate 910. The guide protrusion 921 may contact a side surface of the second substrate 910 in a state in which the second substrate 910 is seated on the substrate holder 920. In this case, the guide protrusion 921 may be configured in plural numbers, and accordingly, the guide protrusion 921 may contact all four-side surfaces of the second substrate 910.

A third coupling protrusion 923 may be formed at a corner of the substrate holder 920. The third coupling protrusion 923 may be inserted into the third coupling hole 913 on which the second substrate 910 is formed while the second substrate 910 is seated on the substrate holder 920. In this case, the third coupling protrusion 923 may be formed in a shape corresponding to the third coupling hole 913. The third coupling protrusion 923 may be formed at four corners of the substrate holder 920, respectively.

A third hole 922 may be formed at an edge region of the substrate holder 920. In this case, the third hole 922 may be aligned in an optical axis direction with the second hole 912 formed in the second substrate 910 and the first hole 713-2 formed in the first substrate 710. The third hole 922 may be a wire through-hole through which the connection wire 800 coupled to the first substrate 710 passes. Meanwhile, an opening may be provided at a center of the substrate holder 920.

The third substrate 930 may be disposed in the opening of the substrate holder 920.

The third substrate 930 may relay a connection among the image sensor module 400, the second substrate 910, and the fourth substrate 940.

The third substrate 930 includes an opening 931 at a center thereof. The opening 931 may be aligned in an optical axis direction with an opening of the first actuator 200 and an opening of the second substrate 910 disposed above.

A third pad portion 932 may be disposed on an upper surface of the third substrate 930. The third pad portion 932 may face the second pad portion 918 disposed on the lower surface of the second substrate 910. That is, the third pad portion 932 may be disposed to be aligned with the second pad portion 918 in an optical axis direction. In addition, the third pad portion 932 may be configured in twelve to correspond to the number of the second pad portions 918. The second pad portion 918 and the third pad portion 932 may be electrically connected to each other via soldering.

In this case, the substrate holder 920 facilitates coupling between the second substrate 910 and the third substrate 930. That is, in the embodiment, when the substrate holder 920 is disposed between the second substrate 910 and the third substrate 930, it is possible to facilitate coupling between the second substrate 910 and the third substrate 930 while matching the pitches of the second pad portion 918 and the third pad portion 932. However, the substrate holder 920 is not an essential component and may be omitted in some cases.

Meanwhile, a fourth pad portion 934 is disposed inside a lower surface of the third substrate 930, and a fifth pad portion 935 is disposed at an edge thereof.

The fourth pad portion 934 may be connected to a pad portion of the image sensor module 400 disposed in the opening 931 of the substrate holder 920.

In this case, the fourth pad portion 934 may include a fourth-first pad portion 934-1 disposed in a first region of the lower surface of the third substrate 930 and a fourth-second pad portion 935-1 disposed in a second region facing the first region with the opening 931 interposed therebetween.

In this case, the fourth-first pad portion 934-1 is a pad for receiving an image signal obtained via the image sensor 440 among signals exchanged with the image sensor module 400. The fourth-second pad portion 935-1 is a pad for exchanging signals other than the image signal with the image sensor module 400.

That is, in the present embodiment, pads connected to the image sensor module 400 may be disposed to separate a pad for receiving an image signal and another pad into different regions. This is because when the pad for receiving the image signal and the pad for receiving the other signals are disposed in the same region, the image signal may include a noise signal, and accordingly, there is a problem that image quality is deteriorated. Therefore, in an embodiment, the pad for receiving the image signal and the other pad are separately disposed in different regions, and thus it is possible to improve quality of the image signal.

In this case, the third pad portion 932 and the second pad portion 918 are disposed in a region overlapped with the fourth-second pad portion 935-2 in an optical axis direction, not a region overlapped with the fourth-first pad portion 935-1 in an optical axis direction. Accordingly, the noise included in the image signal by the signals transmitted from the third pad portion 932 and the second pad portion 918 may be minimized.

In addition, a driver IC 914 and a passive element 915 are disposed on the second substrate 910, and the driver IC 914 and the passive element 915 are disposed in a region overlapped with the fourth-second pad portion 935-2 in an optical axis direction, not a region overlapped with the fourth-first pad portion 935-1 in an optical axis direction. This is to inhibit noise from being included in the image signal by inhibiting signal lines or elements overlapped with the fourth-first pad portion 935-1 in an optical axis direction.

Meanwhile, a fifth pad portion 935 is disposed in an edge region of the third substrate 930. The fifth pad portion 935 is a pad connected to the fourth substrate 940. In this case, the fifth pad portion 935 may be connected 1:1 with the plurality of connection wires 1800 via the fourth substrate 940, respectively. Accordingly, the fifth pad portion 935 may include a fifth-first pad portion 935-1 disposed in a first edge region of the lower surface of the third substrate 930, a fifth-second pad portion 935-2 disposed in a second edge region, a fifth-third pad portion 935-3 disposed in a third edge region, and a fifth-fourth pad portion 935-4 disposed in a fourth edge region. In this case, in order to minimize the signal line distance, the fourth-first pad portion 935-1 may be preferentially connected to the fifth-first pad portion 935-1 adjacent to each other and directly transferred to the first substrate 710 via the fourth substrate 940 and the connection wire 800. That is, in the present embodiment, while a signal path through which an image signal is transmitted is shortened, other pads or elements are not disposed on the signal path through which the image signal is transmitted, and thus it is possible to maintain best quality of the image signal.

The fourth substrate 940 also enables signal transmission while enabling shifting of the image sensor module 400.

The fourth substrate 940 may include an insulating layer 941 and a pattern portion 942 disposed on the insulating layer 941.

The insulating layer 941 may include an opening 941-2. The opening 941-2 may be aligned in an optical axis direction with an opening of the first substrate 710, an opening of the second substrate 910, an opening of the third substrate 930, and an opening of the substrate holder 920.

A pattern portion 942 is disposed on the insulating layer 941. In this case, the pattern portion 942 includes a second lead pattern portion 942-1 having one end thereof connected to the fifth pad portion 935 of the third substrate 930 and the other end thereof connected to the connection wire 800. In addition, the pattern portion 942 includes a reinforcing pattern 942-2 disposed on a corner region of the insulating layer 941. The second lead pattern portion 942-1 is a signal transmission/reception pattern electrically connected to the fifth pad portion 935 of the third substrate 930 and the connection wire 800. In addition, the reinforcing pattern 942-2 is a pattern, in which the insulating layer 941 is disposed on a corner region, for reinforcing rigidity of the fourth substrate 940. Accordingly, the reinforcing pattern 942-2 is not electrically connected to other configurations, and is disposed only in a corner region in which the second lead pattern portion 942-1 is not disposed on an upper surface of the insulating layer 941 to improve rigidity of the fourth substrate 940. In this case, the reinforcing pattern 942-2 may be formed of the same metal material as that of the second lead pattern portion 942-1, and may be simultaneously formed in the same process as the second lead pattern portion 942-1.

The second lead pattern portion 942-1 may be configured in plural numbers. For example, the second substrate 910 may include 36 terminal portions in the same manner as the connection wire 800.

In this case, the second substrate 910 may include a second-first lead pattern portion 942-1a disposed in a first region of the insulating layer 941, a second-third lead pattern portion 942-1c disposed in a second region facing the first region of the insulating layer 941, a second-second lead pattern portion 942-1b disposed in a third region between the first and second regions of the insulating layer 941, and second-fourth lead pattern portion 942-1d disposed in a fourth region facing the third region of the insulating layer 941. That is, the second lead pattern portion 942-1 may include a plurality of second lead patterns respectively disposed in different regions. In this case, the number of the second lead patterns may be equal to or less than the number of the connection wires. When the number of the second lead patterns is the same as the number of the connection wires, all of the second lead patterns may be coupled to the connection wires. In addition, when the number of second lead patterns is less than the number of the connection wires, at least one of the second lead patterns may not be coupled to the connection wire.

In addition, the reinforcing pattern 942-2 may include a first reinforcing pattern 942-2a disposed in a first corner region between the first region and the third region of the insulating layer 941, second reinforcing pattern 942-2b disposed in a second corner region between the third region and the second region of the insulating layer 941, a third reinforcing pattern 942-2c disposed in a third corner region between the second and fourth regions of the insulating layer 941, and a fourth reinforcing pattern 942-2d disposed in a fourth corner region between the first region and the fourth region of the insulating layer 941.

In this case, the insulating layer 941 includes a first insulating region 941-1 having an opening 942-2 at a center thereof and contacting the second lead pattern portion 942-1 and the reinforcing pattern 942-2, and a second insulating region 941-3 protruding in an outward direction from an outer surface of the first insulating region 941-1. The second insulating region 941-3 may be formed to widen a contact area with the reinforcing pattern 942-2 and to further improve rigidity of the fourth substrate 940.

Meanwhile, the reinforcing pattern 942-2 may further include a coupling hole 1943-3, into which a coupling protrusion (not shown) disposed on a lower surface of the substrate holder 920 is inserted.

Meanwhile, the second lead pattern portion 942-1 may include a first portion 942-11 disposed on the insulating layer 941, a third portion 942-13 coupled to the connection wire 800, a second portion 942-12 connecting between the first portion 942-11 and the third portion 942-13, and a fourth portion 942-14 extending from the first portion 942-11 to an inner direction of the insulating layer 941, and being coupled to the fifth pad portion 935 of the third substrate 930.

Here, the first portion 942-11 may be referred to as a body part of the second lead pattern portion 942-1. That is, the first portion 942-11 may be a body part of the second lead pattern portion 942-1 that is disposed on the insulating layer to support another portion thereof. Also, the third portion 942-13 may be referred to as a coupling part coupled to the connection wire 800. Also, the second portion 942-12 may be a connection part connecting the first portion 942-11 and the third portion 942-13. In addition, the fourth portion 942-14 may be referred to as a coupling part coupled to the fifth pad portion 935, or alternatively may be referred to as a pad part.

In addition, a hole through which the connection wire 800 passes may be formed in the third portion 942-13. The third portion 942-13 may be coupled to the connection wire 800 by soldering. The second portion 942-12 may include a bent portion. The second portion 942-12 may be bent at a plurality of times in one direction. The second portion 942-12 may have elasticity. Accordingly, the second lead pattern portion 942-1 may have elasticity.

In this case, when the second portion 942-12 does not include a bent portion, the connection wire 800 may move together when the image sensor module 400 moves and warpage may occur, and break may occur depending on a degree of occurrence of the warpage. On the contrary, in an embodiment, since the second portion 942-12 includes a bent portion, the second portion 942-12 may serve as a suspension when the image sensor module 400 moves, and accordingly, rigidity of the connection wire 800 may be increased by giving elasticity to the connection wire 800.

The fourth portion 942-14 may be electrically connected to the fifth pad portion 935 of the third substrate 930. In this case, the insulating layer 941 is disposed only at a lower portion of the first portion 942-11 of the second lead pattern portion 942-1, and the insulating layer 941 is not disposed in other portions.

The third portion 942-13 may be a bonding pad electrically connected to the connection wire 800. That is, the third portion 942-13 may be a soldering pad that are soldered with the connection wire 800. To this end, the third portion 942-13 may include a fourth hole through which the connection wire 800 passes. In addition, the fourth hole may be aligned with the third hole 922 of the substrate holder 920, the second hole 912 of the second substrate 910, and the first hole 713-2 of the first substrate 710 in the optical axis direction.

The second portion 942-12 may connect the first portion 942-11 and the third portion 942-13. To this end, the second portion 942-12 may include a plurality of bent portions. In this case, each of the second lead pattern portions 942-1a, 942-1b, 942-1c, and 942-1d may be bent in the same direction. For example, the second portion 942-12 of each of the second lead pattern portions 942-1a, 942-1b, 942-1c, and 942-1d, may include a bent portion that rotates clockwise. That is, the second portion 942-12 may be bent in a direction corresponding to a rotation direction in the z-axis direction of the image sensor module. Accordingly, the second portion 942-12 may minimize damage to the second lead pattern portion 942-1 when rotating in the z-axis direction, and accordingly, it is possible to inhibit cracks generated in the second lead pattern portion 942-1 or detachment of the second lead pattern portion 942-1 from the insulating layer 941. Meanwhile, in an embodiment, an adhesive member (not shown) may be disposed between the insulating layer 941 and the second lead pattern portion 942-1. The adhesive member may be interposed between the insulating layer 941 and the second lead pattern portion 942-1 to inhibit the second lead pattern portion 942-1 from being detached on the insulating layer 941. The adhesive member may include a curing adhesive or the like. In addition, the adhesive member may be electroplated to enhance adhesion to the second lead pattern portion 942-1, and accordingly, roughness may be applied to a surface thereof.

Meanwhile, the second lead pattern portion 942-1 is a wire for transmitting an electrical signal, and may be formed of a metal material having high electrical conductivity. To this end, the second lead pattern portion 942-1 may be formed of at least one metal material selected from among gold (Au), silver (Ag), platinum (Pt), titanium (Ti), tin (Sn), copper (Cu), and zinc (Zn). In addition, the circuit pattern 112 may be formed of paste or solder paste including at least one metal material selected from among gold (Au), silver (Ag), platinum (Pt), titanium (Ti), tin (Sn), copper (Cu), and zinc (Zn), which are excellent in bonding strength.

Preferably, the second lead pattern portion 942-1 may serve as a wiring for transmitting an electrical signal, and may be formed of a metal material having an elastic force capable of moving the image sensor module 400 in the X-axis, Y-axis, and Z-axis directions. To this end, the second lead pattern portion 942-1 may be formed of a metal material having a tensile strength of 1000 MPa or more. For example, the second lead pattern portion 942-1 may be a binary alloy or a ternary alloy containing copper. For example, the second lead pattern portion 942-1 may be a binary alloy of copper (Cu)-nickel (Ni). For example, the second lead pattern portion 942-1 may be a binary alloy of copper (Cu)-tin (Sn). For example, the second lead pattern portion 942-1 may be a binary alloy of copper (Cu)-beryllium (Be). For example, the second lead pattern portion 942-1 may be a binary alloy of copper (Cu)-cobalt (Co). For example, the second lead pattern portion 942-1 may be a ternary alloy of copper (Cu)-nickel (Ni)-tin (Sn). For example, the second lead pattern portion 942-1 may be a ternary alloy of copper (Cu)-beryllium (Be)-cobalt (Co). In addition, in addition to the metal material, the second lead pattern portion 942-1 may be formed of an alloy of iron (Fe), nickel (Ni), zinc (Zn), and the like having an elastic force capable of acting as a spring and having good electrical characteristics. Further, the second lead pattern portion 942-1 may be surface-treated with a plating layer containing a metal material such as gold (Au), silver (Ag), palladium (Pd), and the like, thereby improving electrical conductivity.

Meanwhile, the second lead pattern portion 942-1 may be formed by a general process of manufacturing a printed circuit board, such as an additive process, a subtractive process, a modified semi additive process (MSAP), a semi additive process (SAP), etc.

Meanwhile, the second lead pattern portion 942-1 may have different line widths for each portion. The first portion 942-11 may have a wider width than the other portion to improve an adhesion force to the insulating layer 941. In addition, the second portion 942-12 may have a narrower line width compared with the first portion 942-11 to have an elastic force. In this case, the second portion 942-12 may have a line width of 20 to 1000 When the line width of the second portion 942-12 is smaller than 20 overall rigidity of the second lead pattern portion 942-1 may be lowered, thereby lowering reliability of the second lead pattern portion 942-1. In addition, when the line width of the second portion 942-12 is larger than 1000 an elastic force of the second lead pattern portion 942-1 may be lowered, which may cause a problem in a shift of the image sensor module 400.

Meanwhile, the second portion 942-12 may include a buffer pattern portion for a buffering role in a region A connected to the first portion 942-11. The buffer pattern portion may have a shape in which a width gradually decreases in a direction from the first portion 942-11 to the second portion 942-12. In this case, the width reduction is not linear but has a non-linear characteristic, and accordingly, an outer surface of the buffer pattern portion may have a rounded or curved shape.

The buffer pattern portion may solve a problem such as a pattern break caused by a pattern width difference between the first portion 942-11 and the second portion 942-12, and stably connect between the first portion 942-11 and the third portion 942-13.

In addition, the buffer pattern portion may not be overlapped with the insulating layer in a vertical direction. Accordingly, when the substrate is not only moved in the X, Y and Z axes, but also tilted, a point in which the connection portion and the pattern portion are connected is not existed on the insulating layer, and is formed outside the insulating layer, and thus pattern breakage caused by a difference in width between the connection portion and the pattern portion can be effectively reduced.

In addition, the fourth portion 942-14 may also have a line width smaller than that of the first portion 942-11, and accordingly, a buffer pattern portion having a rounded or curved outer surface may be disposed in a region B between the fourth portion 942-14 and the first portion 942-11.

Meanwhile, the second portion 942-12 may be bent at least once as set above. Accordingly, the second portion 942-12 includes a second-first portion 942-12a extending in one direction and a second-second portion 942-12b that is bent in a direction different from the one direction in the second-first portion 942-12a.

In this case, a side surface of the second-second portion 942-12b may have a rounded shape or a curved shape instead of a straight line. That is, when the side surface of the second-second portion 942-12b has a straight shape, stress may be concentrated on the portion, and accordingly, breakage of the second lead pattern portion 942-1 may occur. Accordingly, the side surface of the second-second portion 942-12b has a rounded or curved shape to inhibit concentration of stress in the second-second portion 942-12b. In this case, a curvature-R value of the side surface of the second-second portion 942-12b may have a value between 30 and 100. When the curvature-R value of the side surface is smaller than 30, the stress concentration inhibiting effect is insufficient, and when larger than 100, an elastic force of the second lead pattern portion 942-1 may decrease. In this case, the second-second portion 942-12b may include an inner surface and an outer surface along the bending direction. In addition, a curvature-R value of the inner surface of the second-second portion 942-12b may be different from that of the outer surface of the second-second portion 942-12b to maximize a role of stress relaxation.

In addition, the second-second portion 942-12b may be different from the line width of the second-first portion 942-12a. For example, the second-second portion 942-12b may have a line width larger than that of the second-first portion 942-12a. This is, the stress may be concentrated in the second-second portion 942-12b and accordingly, the second-second portion 942-12b may be formed while having a line width larger than that of the second-first portion 942-12a.

Meanwhile, the fifth pad portion 935 of the third substrate 930 is positioned on the fourth portion 942-14. In addition, the fourth portion 942-14 and the fifth pad portion 935 of the third substrate 930 may be coupled to each other via soldering.

Meanwhile, in the above description, the second portion 942-12 of the second lead pattern portion 942-1 has a rectangular shape with rounded corners, but is not limited thereto. For example, the second portion 942-12 of the second lead pattern portion 942-1 may have a circular shape or a polygonal shape and may be bent.

<Image Sensor Module>

Figure 19:
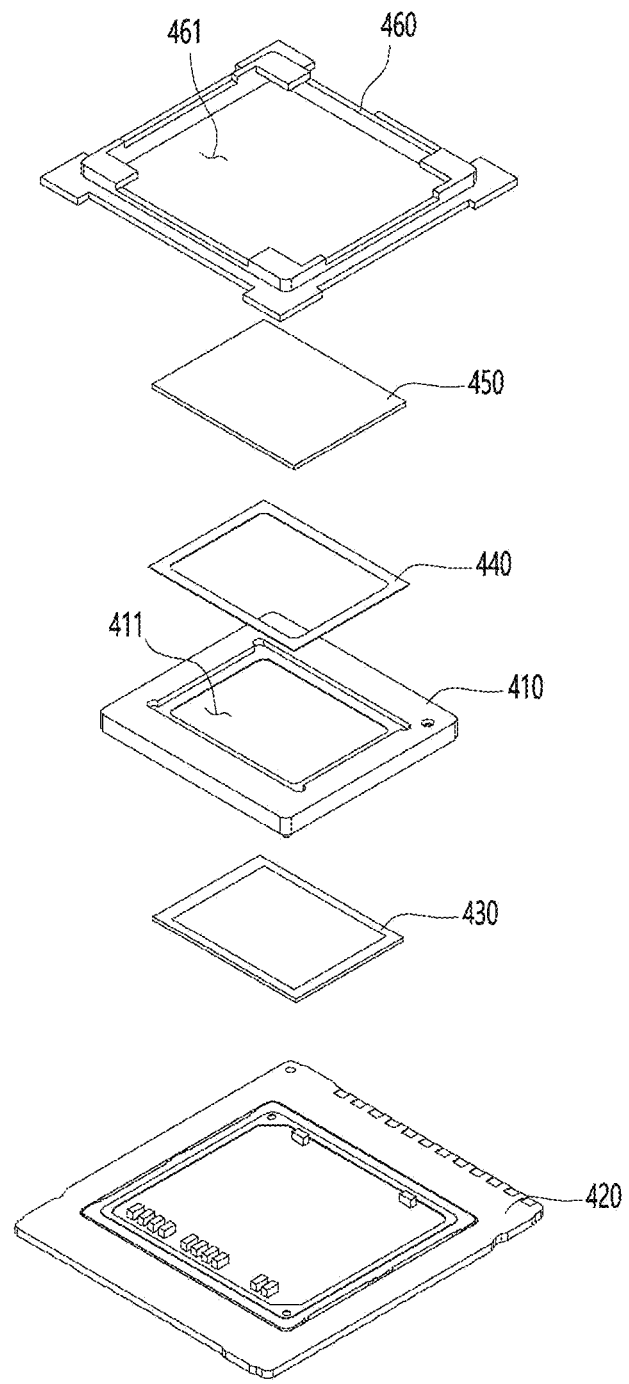
FIG. 19 is an exploded perspective view of an image sensor module 400 according to the embodiment.
Figure 20:
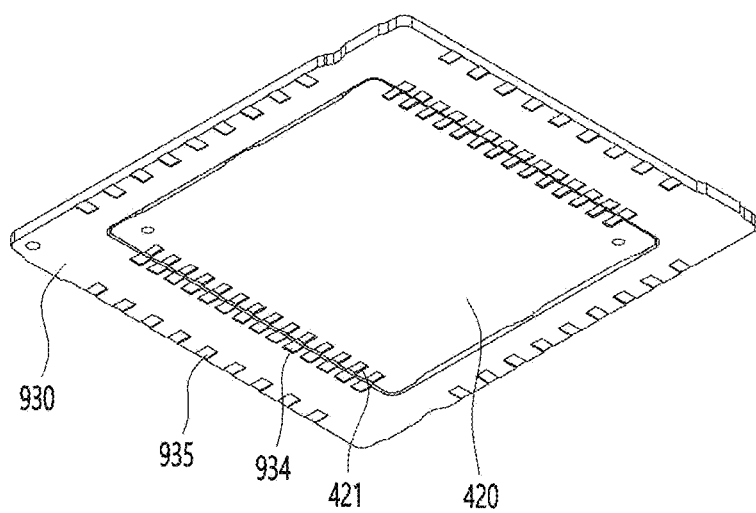
FIG. 20 is a connection view of the third substrate and the image sensor module 400.

FIG. 19 is an exploded perspective view of an image sensor module 400 according to an embodiment, and FIG. 20 is a connection view of a third substrate and the image sensor module 400.

Referring to FIGS. 19 and 20, the image sensor module 400 may include a sensor holder 460, a filter 450, the adhesive member 440, a sensor base 410, the image sensor 430, and an image sensor substrate 420.

Such an image sensor module 400 may be coupled to the second substrate 910 and the substrate holder 920 via the sensor holder 460. For example, the image sensor module 400 may be fixed to the substrate holder 920 via the sensor holder 460. The image sensor module 400 may include the sensor holder 460, the filter 450, the adhesive member 440, the sensor base 410, the image sensor 430, and the image sensor substrate 420, but at least one of configurations may be omitted.

The image sensor module 400 may include the sensor holder 460. The sensor holder 460 allows the image sensor module 400 to be stably fixed to the substrate holder 920. In this case, the sensor holder 460 may include an opening 461, and the opening 461 may be aligned with the filter 450 and the image sensor 430 in an optical axis direction.

The image sensor module 400 includes the sensor base 410.

The sensor base 410 may include an opening 411, and a stepped protrusion may be provided to allow the filter 450 to be seated adjacent to the opening 411. In addition, the adhesive member 440 may be disposed on the stepped protrusion, and the filter 450 may be fixedly disposed on the adhesive member 440. Such a filter 450 may serve to block light of a specific frequency band of light passing through the lens module 100 from being incident on the image sensor 430. The filter 450 may be disposed to be parallel to an x-y plane. The filter 450 may be disposed between the lens module 100 and the image sensor 430. The filter 450 may include an infrared filter. The infrared filter may absorb or reflect infrared light incident on the infrared filter.

The image sensor substrate 420 may be a package substrate. That is, the image sensor 430 may be mounted in a package form on the image sensor substrate 420. The image sensor substrate 420 may include a printed circuit board (PCB). The image sensor substrate 420 may include a circuit board. The image sensor 430 may be disposed on the image sensor substrate 420. The image sensor substrate 420 may be coupled to the third substrate 930. To this end, a sixth pad portion 421 electrically connected to the fifth pad portion 935 of the third substrate 930 may be provided on a lower surface of the image sensor substrate 420. In this case, as described above, the sixth pad portion 421 is also disposed at edge regions opposite to each other on the lower surface of the image sensor substrate 420, and accordingly, positions of the pads to which the image signal is transmitted can be separated from the other pads. Meanwhile, the image sensor substrate 420 may be positioned in the opening of the third substrate 930, and the sixth pad portion 421 in the opening of the third substrate 930 may be aligned with the fifth pad portion 935 of the third substrate 930 in a horizontal direction. The fifth pad portion 935 and the sixth pad portion 421 may be coupled to each other via soldering or the like.

The image sensor 430 may have a configuration in which light passing through the lens module 100 and the filter 450 is incident to form an image. The image sensor 430 may be mounted on the image sensor substrate 420. The image sensor 430 may be electrically connected to the image sensor substrate 420. For example, the image sensor 430 may be coupled to the image sensor substrate 420 by surface mounting technology (SMT). As another example, the image sensor 430 may be coupled to the image sensor substrate 420 by flip chip technology. The image sensor 430 may be disposed to coincide with the lens module 100 in an optical axis. That is, the optical axis of the image sensor 430 and the optical axis of the lens module 100 may be aligned. The image sensor 430 may convert light irradiated to the effective image region of the image sensor 430 into an electrical signal. In addition, the converted electrical signal may be an image signal. The image sensor 430 may be any one of a charge coupled device (CCD), a metal oxide semi-conductor (MOS), a CPD, and a CID.

<Image Sensor Module Shift Driving Operation>

Hereinafter, a shift operation of the image sensor module 400 will be described.

Figure 21:
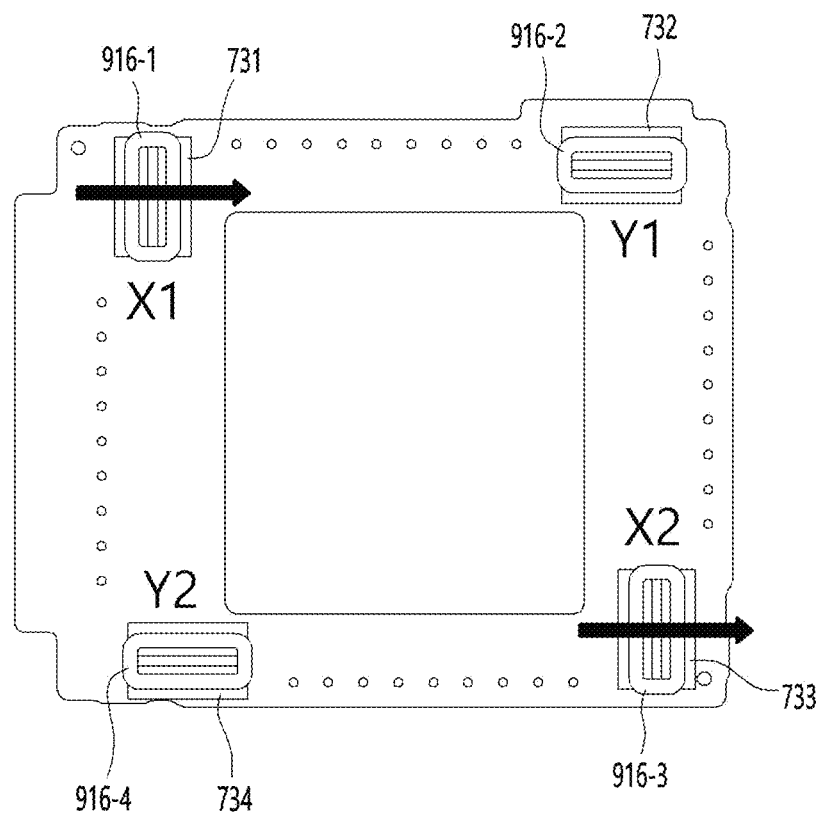
FIG. 21 is a view for describing an x-axis direction shift drive through a part of a configuration of the camera device according to the embodiment.
Figure 22:
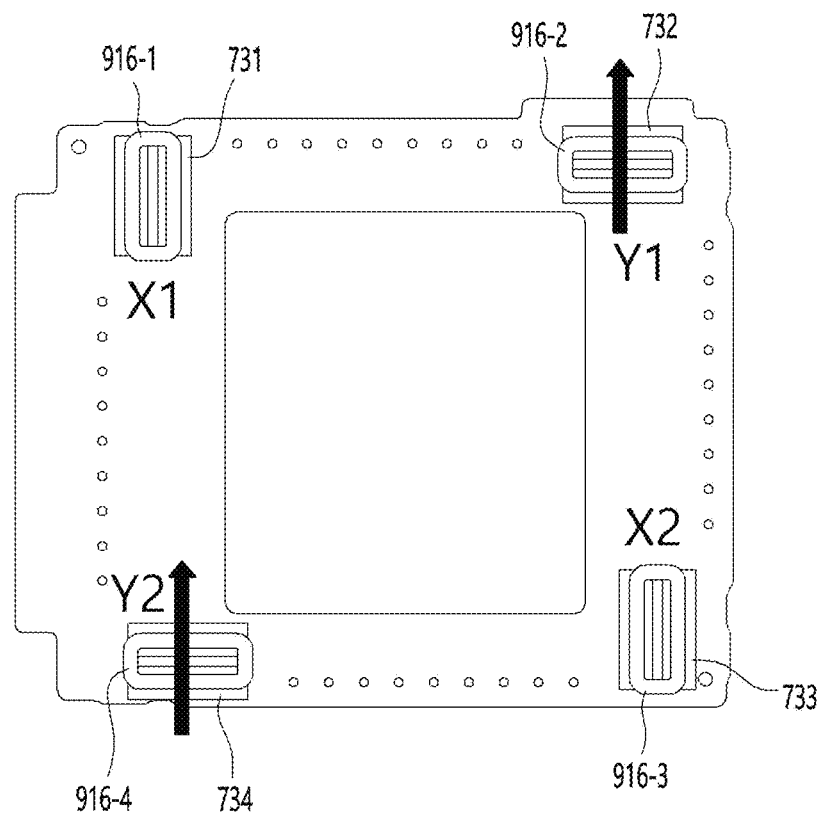
FIG. 22 is a view for describing a y-axis direction shift drive through a part of a configuration of the camera device according to the embodiment.
Figure 23:
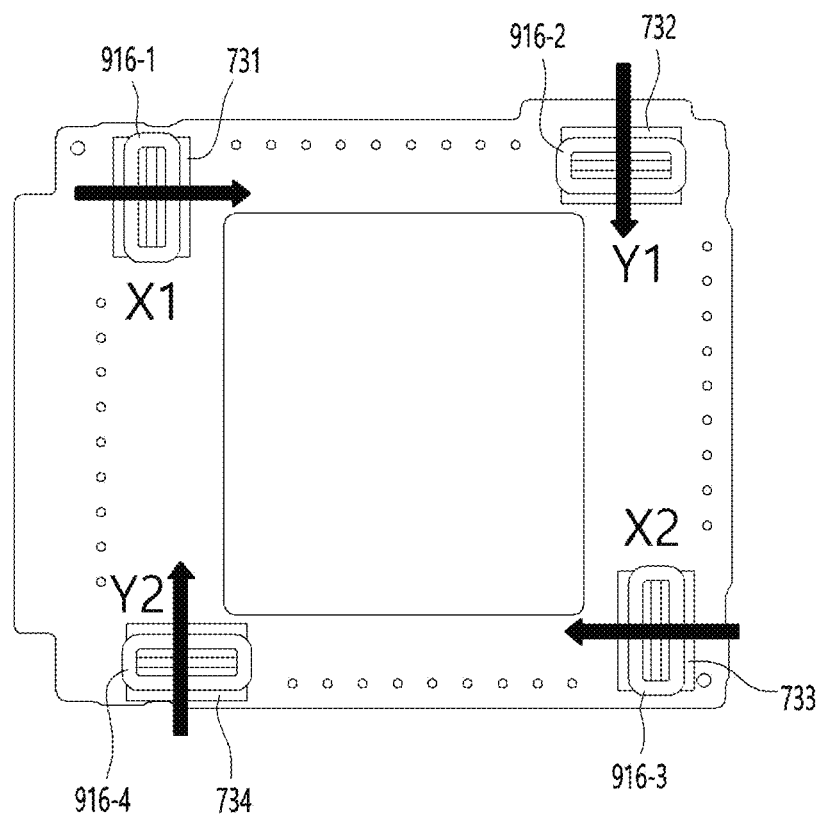
FIG. 23 is a view for describing a z-axis rotational drive through a part of a configuration of the camera device according to the embodiment.
Figure 23:
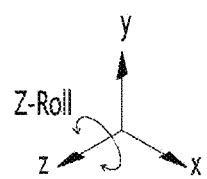
Figure 24A:
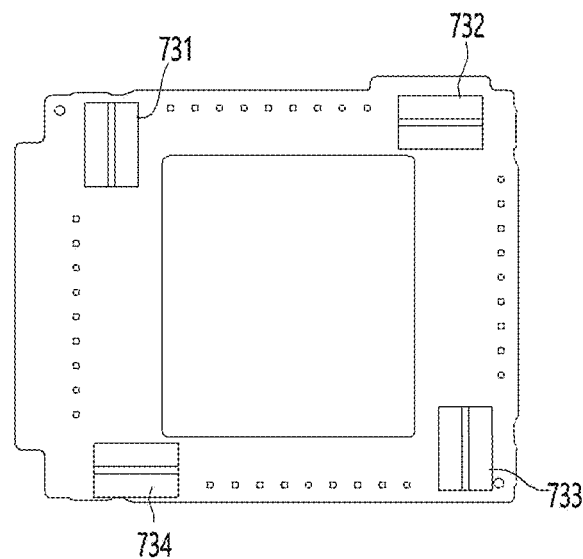
FIG. 24(a) is a view illustrating a magnet disposed on a substrate holder together with an x-axis and a y-axis.
Figure 24B:
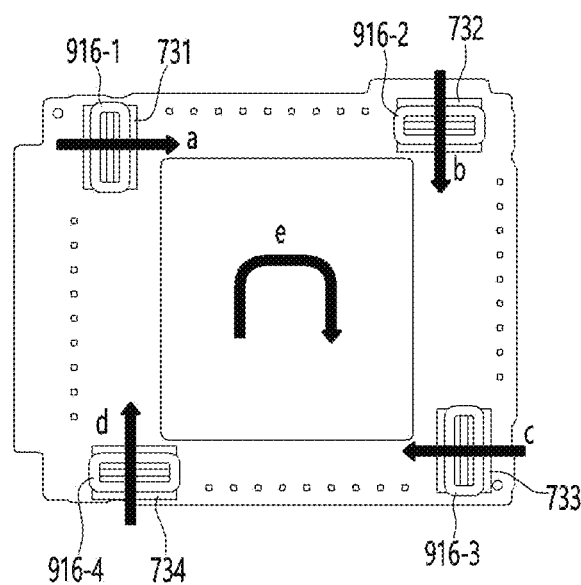
FIG. 24(b) is a view illustrating the substrate holder, the magnets, and coils together with a z-axis direction rotational drive.
Figure 25:
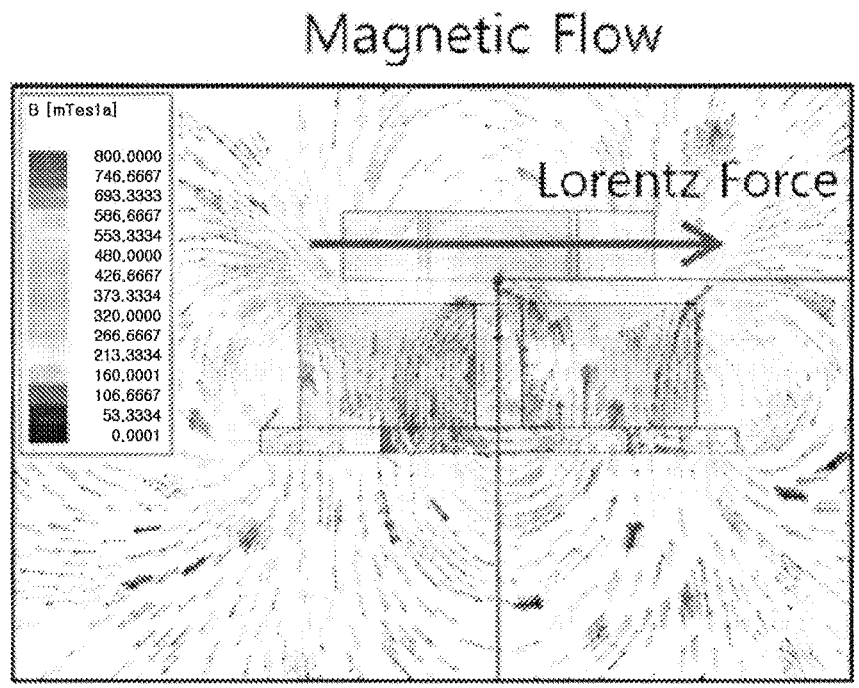
FIG. 25 is a view illustrating a magnetic flow and a Lorentz force between a magnet and a coil of the camera device according to the first embodiment.

FIG. 21 is a view for describing an x-axis direction shift drive through a part of a configuration of the camera device according to the embodiment, FIG. 22 is a view for describing a y-axis direction shift drive through a part of a configuration of the camera device according to the embodiment, FIG. 23 is a view for describing a z-axis rotational drive through a part of a configuration of the camera device according to the embodiment, FIG. 24 (*a*) is a view illustrating a magnet disposed on a substrate holder together with an x-axis and a y-axis, FIG. 24 (*b*) is a view illustrating the substrate holder, the magnets, and coils together with a z-axis direction rotational drive, and FIG. 25 is a view illustrating a magnetic flow and a Lorentz force between a magnet and a coil of the camera device according to the first embodiment.

As shown in FIG. 21, when currents in the same direction are applied to the first coil 916-1 and the third coil 916-3 in the present embodiment, the image sensor 430 coupled to the image sensor module 400 may be moved (shifted) in the x-axis direction by electromagnetic interaction between the first magnet 731 and the third magnet 733, respectively. That is, the first coil 916-1, the first magnet 731, and the third coil 916-3 and the third magnet 733 may be used for the x-axis direction shift drive of the image sensor 430. In this case, the first coil 916-1 and the first magnet 731 may be a first x-axis shift driver X1, and the third coil 916-3 and the third magnet 733 may be a second x-axis shift driver X2.

As shown in FIG. 22, when currents in the same direction are applied to the second coil 916-2 and the fourth coil 916-4 the present embodiment, the image sensor 430 coupled to the image sensor module 400 may be moved (shifted) in the y-axis direction by electromagnetic interaction between the second magnet 732 and the fourth magnet 734, respectively. That is, the second coil 916-2, the second magnet 732, the fourth coil 916-4, and the fourth magnet 734 may be used for the y-axis direction shift drive of the image sensor 430. In this case, the second coil 916-2 and the second magnet 732 may be a first y-axis shift driver Y1, and the fourth coil 916-4 and the fourth magnet 734 may be a second y-axis shift driver Y2.

As shown in FIG. 23, currents in opposite directions are applied to the first coil 916-1 and the third coil 916-3 and currents in opposite directions are applied to the second coil 916-2 and the fourth coil 916-4 in the present embodiment, and at this time, when a direction in which the coin portion 916 is rotated by the current applied to the first coil 916-1 and the current applied to the second coil 916-2 is the same, the image sensor 430 coupled to the image sensor module 400 may be rotated (rolled) around the z-axis. An embodiment shown in FIG. 23 illustrates a case in which the coil portion 916 is controlled by four channels, and when the coil portion 916 is controlled by three channels, the image sensor 430 may be rolled by the first coil 916-1 and the third coil 916-3 or the second coil 916-2 and the fourth coil 916-4. This is because when there is a coil bundled into one channel among the first coil 916-1 and the third coil 916-3, and the second coil 916-2 and the fourth coil 916-4, the current may not be applied in the opposite direction.

As shown in FIG. 24(*b*), in the present embodiment, a forward current is applied to the first coil 916-1, whereby the first coil 916-1 is pushed in a first direction (see (a)) with respect to the first magnet 731, a forward current is applied to the second coil 916-2, whereby the second coil 916-2 is pushed in a second direction (see (b)) with respect to the second magnet 732, a reverse current is applied to the third coil 916-3, whereby the third coil 916-3 is pushed in a third direction (see (c)) with respect to the third magnet 733, and a reverse current is applied to the fourth coil 916-4, whereby the fourth coil 916-4 is pushed in a fourth direction (see (d)) with respect to the fourth magnet 734, so that the image sensor 430 coupled to the image sensor module 400 may be rotated around the z-axis (see in (e)). In this case, the first to fourth directions may correspond to a clockwise direction around the center of the substrate holder 410.

In the present embodiment, a magnetic flow of the magnet portion 730 is shown in FIG. 25. Referring to FIG. 25, it may be confirmed that lines of magnetic force passing perpendicular to the coil portion 916 exists, and when a current is applied to the coil portion 916 in this state, the coil portion 916 may move with respect to the magnet portion 730 by the Lorentz force.

<Optical Device>

Figure 26:
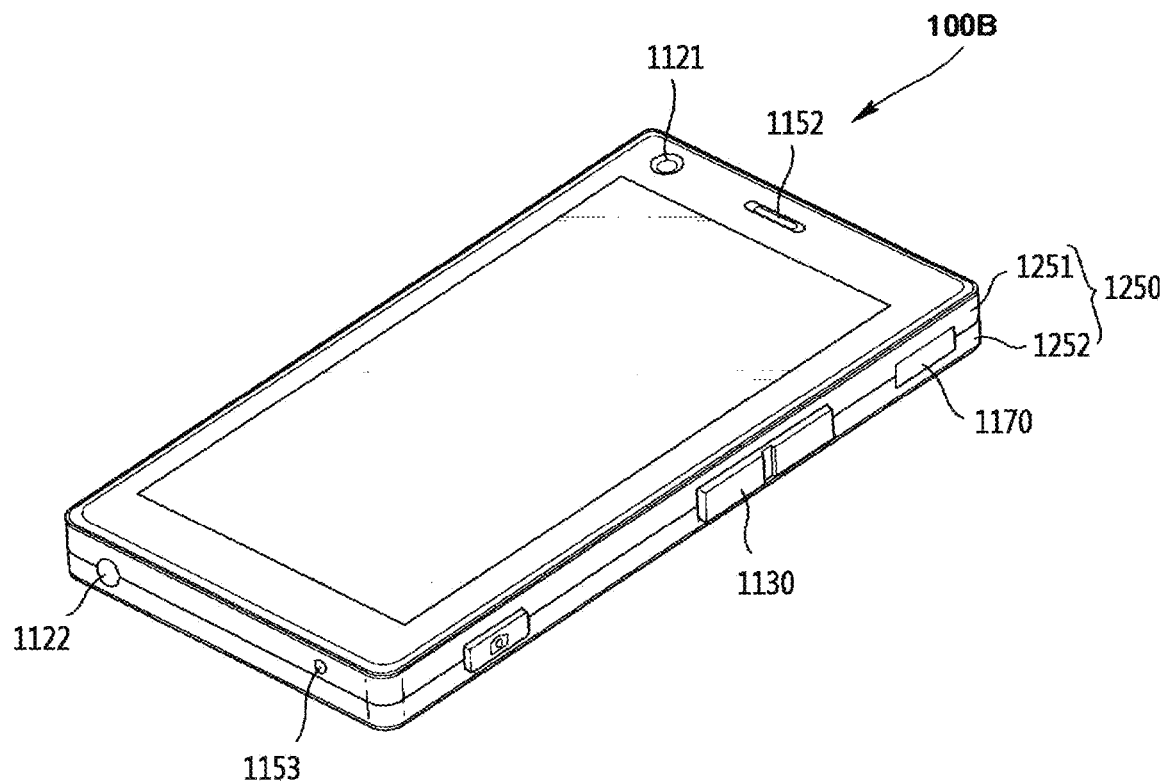
FIG. 26 is a perspective view of an optical device according to the present embodiment.
Figure 27:
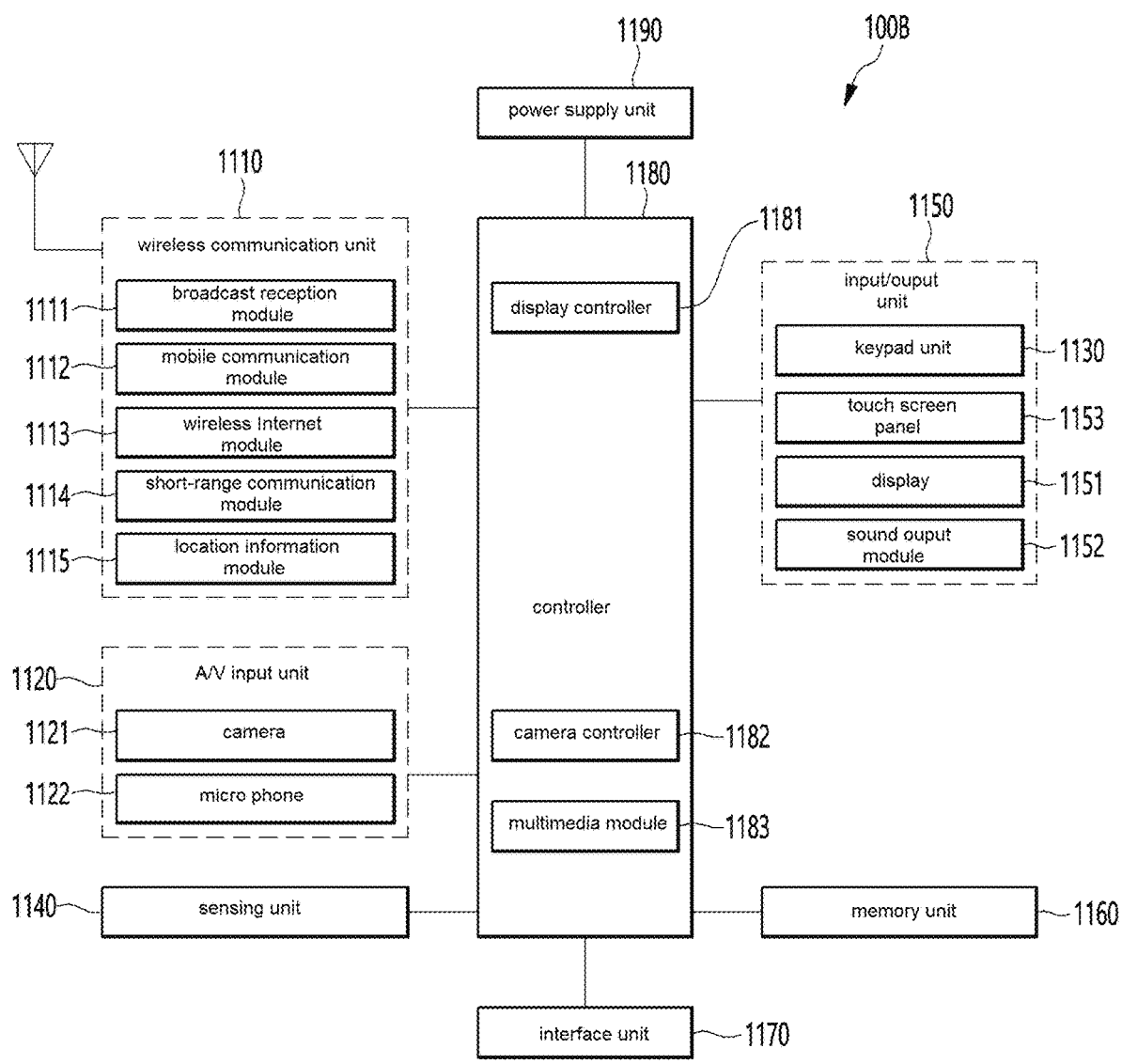
FIG. 27 is a configuration diagram of the optical device shown in FIG. 26.

FIG. 26 is a perspective view of an optical device according to the present embodiment, and FIG. 27 is a block diagram of the optical device shown in FIG. 26.

The optical device may be any one of a mobile phone and a portable phone, a smart phone, a portable smart device, a digital camera, a laptop computer, a digital broadcasting terminal, a personal digital assistant (PDA), a portable multimedia player (PMP), and a navigation device. However, types of the optical device are not limited thereto, and any device for capturing an image or a picture may be included in the optical device.

The optical device may include a main body 1250. The main body 1250 may be in the form of a bar. Alternatively, the main body 1250 may have various structures such as a slide type, a folder type, a swing type, a swivel type, and the like in which two or more sub-bodies are coupled to be relatively movable. The main body 1250 may include a case (casing, housing, and cover) forming an external appearance. For example, the main body 1250 may include a front case 1251 and a rear case 1252. Various electronic components of the optical device may be built in a space formed between the front case 1251 and the rear case 1252. A display 2151 may be disposed on one surface of the main body 1250. A camera 1121 may be disposed on any one or more surfaces of one surface of the main body 1250 and the other surface disposed on the opposite side of the one surface.

The optical device may include a wireless communication unit 1110. The wireless communication unit 1110 may include one or more modules that enable wireless communication between the optical device and a wireless communication system or between the optical device and a network in which the optical device is positioned. For example, the wireless communication unit 1110 may include any one or more of a broadcast receiving module 1111, a mobile communication module 1112, a wireless internet module 1113, a short range communication module 1114, and a position information module 1115.

The optical device may include an A/V input unit 1120. The A/V input unit 1120 is for inputting an audio signal or a video signal and may include any one or more of a camera 1121 and a microphone 1122. In this case, the camera 1121 may include a camera device according to the first or embodiment described above.

The optical device may include a sensing unit 1140. The sensing unit 1140 may sense a current state of the optical device such as an opening/closing state of the optical device, a position of the optical device, a presence of a user contact, orientation of the optical device, acceleration/deceleration of the optical device, and the like to generate a sensing signal for controlling an operation of the optical device. For example, when the optical device is in the form of a slide phone, whether the slide phone is opened or closed may be sensed. In addition, it may be responsible for sensing functions related to whether a power supply unit 1190 supplies power or whether an interface unit 1170 is coupled to an external device.

The optical device may include an input/output unit 1150. The input/output unit 1150 may be a configuration for generating an input or output related to vision, hearing, or tactile sense. The input/output unit 1150 may generate input data for controlling an operation of the optical device, and may output information processed by the optical device.

The input/output unit 1150 may include at least one of a keypad portion 1130, a display 1151, a sound output module 1152, and a touch screen panel 1153. The keypad portion 1130 may generate input data by using a keypad input. The display 1151 may output an image captured by the camera 1121. The display 1151 may include a plurality of pixels whose color changes according to an electrical signal. For example, the display 1151 may include at least one of a liquid crystal display (LCD), a thin film transistor-liquid crystal display (TFT LCD), an organic light-emitting diode (OLED), a flexible display, and a three-dimensional (3D) display. The sound output module 1152 may output audio data received from the wireless communication unit 1110 in a call signal reception, a call mode, a recording mode, a voice recognition mode, or a broadcast reception mode, or output audio data stored in a memory unit 1160. The touch screen panel 1153 may convert a change in capacitance generated due to a user's touch on a specific region of a touch screen into an electrical input signal.

The optical device may include the memory unit 1160. The memory unit 1160 may store a program for processing and controlling a controller 1180. In addition, the memory unit 1160 may store input/output data, for example, any one or more of a phone book, a message, audio, a still image, a photo, and a video. The memory unit 1160 may store an image captured by the camera 1121, for example, a picture or a video.

The optical device may include the interface unit 1170. The interface unit 1170 serves as a path for connecting with an external device connected to the optical device. The interface unit 1170 may receive data from an external device, receive power to transfer to each element inside the optical device, or transmit data within the optical device to an external device. The interface unit 1170 may include any one or more of a wired/wireless headset port, an external charger port, a wired/wireless data port, a memory card port, a port connecting a device equipped with an identification module, and audio input/output (I/O) port, a video input/output (I/O) port, and an earphone port.

The optical device may include the controller 1180. The controller 1180 may control an overall operation of the optical device. The controller 1180 may perform related control and processing for voice call, data communication, video call, and the like. The controller 1180 may include a multimedia module 1181 for playing multimedia. The multimedia module 1181 may be provided in the controller 1180, or may be provided separately from the controller 1180. The controller 1180 may perform a pattern recognition processing for recognizing a writing input or a drawing input performed on a touch screen as text and an image, respectively.

The optical device may include the power supply unit 1190. The power supply unit 1190 may receive an external power source or an internal power source by a control of the controller 1180 to supply the power necessary for operating each element.

According to the embodiment, in order to realize OIS and AF functions of the camera module, instead of moving the conventional lens barrel, the image sensor is moved relative to the lens barrel in the X-axis, Y-axis, and Z-axis directions. Accordingly, the camera module according to the embodiment may remove a complicated spring structure for realizing the OIS and AF functions, thereby simplifying a structure. In addition, the structure that is more stable than the existing one may be formed by moving the image sensor according to the embodiment relative to the lens barrel.

In addition, according to the embodiment, the terminal portion electrically connected to the image sensor has a spring structure and is disposed to be floated at a position not overlapped with the insulating layer in the vertical direction. Accordingly, the camera module may move the image sensor relative to the lens barrel while supporting the image sensor stably and elastically.

According to the above-described embodiment, a X-axis direction shift, a Y-axis direction shift, and a Z-axis-centered rotation corresponding to camera shake with respect to the image sensor may be performed, and accordingly, the camera shake correction with respect to the lens corresponding to the camera shake correction with respect to the image sensor may be performed together, thereby providing a more enhanced camera shake correction function.

In addition, according to the embodiment, it is possible to reduce a total height of the camera device by embedding electrical elements required for a camera circuit by utilizing an internal space of the second actuator for moving the image sensor relative to the lens barrel.

Further, according to the embodiment, a camera assembly process may be simplified by integrating and fusing components of the camera circuit and components of the second actuator.

Although the embodiments of the present invention have been described with reference to the accompanying drawings, those skilled in the art to which the present invention pertains will be understood that the present invention may be implemented in other specific forms without modifying the technical spirit and essential features of the present invention. Therefore, it should be understood that the embodiments described above are illustrative in all aspects and not restrictive.

The invention claimed is:

1. A sensor driving apparatus comprising:
a fixed portion including a magnet holder, a magnet portion coupled to the magnet holder, and a first substrate disposed on the magnet holder and including a first lead pattern portion;
a moving portion disposed to be spaced apart from the fixed portion by a predetermined interval and including an image sensor and a coil portion corresponding to the magnet portion; and
a wire portion including a plurality of wires disposed between the moving portion and the fixed portion,
wherein the wire portion has one end connected to the first lead pattern portion and an other end connected to the moving portion to elastically support the moving portion,
wherein the moving portion is driven by the magnet portion and the coil portion in a state movably supported to the fixed portion through the wire portion,
wherein the wire portion includes a plurality of wires,
wherein the magnet portion includes a plurality of magnets, and
wherein each of the plurality of wires is positioned between the plurality of magnets.

2. The sensor driving apparatus of claim 1, wherein the moving portion includes a second lead pattern portion, and
wherein the other end of the wire portion is connected to the second lead pattern portion.

3. The sensor driving apparatus of claim 2, wherein the second lead pattern portion includes:
a body part;
a first coupling part coupled to the other end of the wire portion and including a second hole; and
a connection part connecting the body part and the first coupling part.

4. The sensor driving apparatus of claim 3, wherein the first lead pattern portion includes a plurality of first lead patterns,
wherein the second lead pattern portion includes a plurality of second lead patterns,
wherein the wire portion includes a plurality of wires, and
wherein a number of the plurality of wires is equal to or less than each of a number of the plurality of first lead patterns and a number of the plurality of second lead patterns.

5. The sensor driving apparatus of claim 4, comprising:
a sensor substrate on which the sensor is disposed,
wherein the third substrate includes an opening in which the sensor substrate is disposed.

6. The sensor driving apparatus of claim 3, wherein the moving portion includes an insulating layer on which the second lead pattern portion is disposed.

7. The sensor driving apparatus of claim 6, wherein the insulating layer includes an opening aligned with the image sensor in an optical axis direction,
wherein the second lead pattern portion includes a second coupling part extending from the body part toward the opening, and
wherein the second coupling part does not overlap the insulating layer in the optical axis direction.

8. The sensor driving apparatus of claim 7, wherein the body part of the second lead pattern portion overlaps the insulating layer in the optical axis direction, and
wherein the first coupling part and the connection part of the second lead pattern portion do not overlap the insulating layer in the optical axis direction.

9. The sensor driving apparatus of claim 2, wherein the connection part of the second lead pattern portion includes a bent region.

10. The sensor driving apparatus of claim 9, wherein the bent region of each of the plurality of second lead patterns is bent by rotating in a same direction as each other.

11. The sensor driving apparatus of claim 2, wherein the moving portion includes:
a second substrate on which the coil portion is disposed, and including a first pad portion;
a third substrate disposed between the second substrate and the second lead pattern portion and including a second pad portion connected to the first pad portion and a third pad portion electrically connected to the second lead pattern portion.

12. The sensor driving apparatus of claim 11, comprising:
a substrate holder disposed between the second substrate and the second lead pattern portion.

13. The sensor driving apparatus of claim 11, comprising:
a driving circuit disposed on the second substrate;
wherein the second substrate includes a hole through which the wire portion passes.

14. The sensor driving apparatus of claim 11, wherein the third substrate includes a fourth pad portion connected to a terminal of the image sensor, and
wherein the fourth pad portion includes:
a fourth-first pad part disposed on one side of a lower surface of the third substrate; and
a fourth-second pad part disposed on the other side facing the fourth-first pad part on the lower surface of the third substrate.

15. The sensor driving apparatus of claim 14, wherein the fourth-first pad part is a pad for receiving an image signal through the image sensor, and
wherein the fourth-second pad part is a pad for receiving a signal other than the image signal.

16. The sensor driving apparatus of claim 2, wherein the wire portion is arranged to extend long in an optical axis direction, and,
wherein the second lead pattern portion includes a second hole through which the wire portion passes.

17. The sensor driving apparatus of claim 16, wherein the first hole and the second hole are aligned in the optical axis direction.

18. The sensor driving apparatus of claim 1, wherein the first substrate includes a first hole passing through the first lead pattern portion, and wherein one end of the wire portion is fixed to the first lead pattern portion while being inserted into the first hole.

19. The sensor driving apparatus of claim 1, wherein the moving portion moves in a first direction perpendicular to an optical axis, moves in a second direction perpendicular to the optical axis and the first direction, and rotates about the optical axis.

\* \* \* \* \*